United States Patent
Wang et al.

(10) Patent No.: US 11,198,632 B2
(45) Date of Patent: Dec. 14, 2021

(54) PROCESS FOR THE TREATMENT OF SLUDGE

(71) Applicant: THE UNIVERSITY OF QUEENSLAND, St Lucia (AU)

(72) Inventors: Qilin Wang, St Lucia (AU); Zhiguo Yuan, St Lucia (AU); Haoran Duan, St Lucia (AU); Wei Wei, St Lucia (AU)

(73) Assignee: THE UNIVERSITY OF QUEENSLAND, St Lucia (AU)

( * ) Notice: Subject to any disclaimer, the term of this patent is extended or adjusted under 35 U.S.C. 154(b) by 0 days.

(21) Appl. No.: 16/496,050

(22) PCT Filed: Mar. 29, 2018

(86) PCT No.: PCT/AU2018/050292
§ 371 (c)(1),
(2) Date: Sep. 20, 2019

(87) PCT Pub. No.: WO2018/176096
PCT Pub. Date: Oct. 4, 2018

(65) Prior Publication Data
US 2020/0331788 A1    Oct. 22, 2020

(30) Foreign Application Priority Data
Mar. 30, 2017  (AU) .............................. 2017901156

(51) Int. Cl.
*C02F 11/04* (2006.01)
*C02F 3/12* (2006.01)
*C02F 1/66* (2006.01)

(52) U.S. Cl.
CPC ............... *C02F 11/04* (2013.01); *C02F 1/66* (2013.01); *C02F 3/1221* (2013.01);
(Continued)

(58) Field of Classification Search
CPC .... C02F 11/04; C02F 3/1221; C02F 2209/14; C02F 2209/06; Y02W 10/10; Y02E 50/30
(Continued)

(56) References Cited

U.S. PATENT DOCUMENTS 9,005,333 B1    4/2015  Vanotti et al.
2007/0062233 A1*  3/2007  Burnham .................. C05F 9/00
                                                        71/11
(Continued)

FOREIGN PATENT DOCUMENTS

EP    2837679 A1    2/2015
JP    2002-177994 A  6/2002
(Continued)

OTHER PUBLICATIONS

International Search Report for PCT/AU2018/050292, dated Jun. 22, 2018, 4 pages.
(Continued)

*Primary Examiner* — Fred Prince
(74) *Attorney, Agent, or Firm* — Nixon & Vanderhye P.C.

(57) ABSTRACT

A method for treating a sludge derived from sewage or wastewater, the method comprising subjecting the sludge to a treatment step at a pH of 8.9 or greater and a free ammonia (FA) content of 100 mg $NH_3$—N/L or greater. The treated sludge may be fed to a bioreactor to produce methane.

18 Claims, 9 Drawing Sheets

(52) U.S. Cl.
CPC ...... *C02F 2209/06* (2013.01); *C02F 2209/14* (2013.01); *Y02E 50/30* (2013.01); *Y02W 10/10* (2015.05)

(58) Field of Classification Search
USPC .... 210/603, 605, 631, 903, 749, 757, 198.1, 210/205
See application file for complete search history.

(56) References Cited

U.S. PATENT DOCUMENTS

| | | | |
|---|---|---|---|
| 2008/0156726 A1* | 7/2008 | Fassbender | C02F 3/28 210/613 |
| 2012/0315209 A1 | 12/2012 | Bisson et al. | |
| 2016/0297699 A1 | 10/2016 | Massé | |

FOREIGN PATENT DOCUMENTS

| | | |
|---|---|---|
| JP | 2007-117948 A | 5/2007 |
| WO | 2013/060338 A1 | 5/2013 |
| WO | 2014/177156 A1 | 11/2014 |

OTHER PUBLICATIONS

Written Opinion of the ISA for PCT/AU2018/050292, dated Jun. 22, 2018, 4 pages.
Extended European Search Report dated Oct. 21, 2020, issued in European Application No. 18776916.1, 9 pages.

* cited by examiner

Baseline phase

Experimental phase

PROCESS FOR THE TREATMENT OF SLUDGE

This application is the U.S. national phase of International Application No. PCT/AU2018/050292 filed 29 Mar. 2018, which designated the U.S. and claims priority to AU Patent Application No. 2017901156 filed 30 Mar. 2017, the entire contents of each of which are hereby incorporated by reference.

TECHNICAL FIELD

The present invention relates to a process for the treatment of sludge. In some embodiments, the present invention relates to the treatment of a sludge from a bioreactor for treating wastewater/secondary treatment in a wastewater treatment plant, with the treated sludge being fed to an anaerobic digester, an aerobic digester or back to the bioreactor for treating wastewater. In other embodiments, the present invention relates to the treatment of sludge from a screen or a primary settler.

BACKGROUND ART

Microbial processes play a central role in wastewater management. In particular, they underpin biological treatment of wastewater, the most cost-effective and environmentally friendly method for wastewater treatment.

A typical advanced wastewater treatment plant receives wastewater from sewage mains. The wastewater is first treated to remove large particulates (by screening, or passing through a primary settler, or both). The liquor then passes to bioreactors, where bacteria mineralise organic carbon (often referred to as biological oxygen demand or BOD) to $CO_2$ and convert ammonia to nitrate, and in some cases further to nitrogen gas. Some bioreactors also achieve biological phosphorus removal. This process results in the growth of biomass. The biomass is then separated from the liquor, typically in a secondary settler.

The sludge from the secondary settler (which includes most of the separated biomass) is then treated in an anaerobic digester or an aerobic digester, sometimes together with primary sludge resulting from the settling process in the primary settler. In the anaerobic digester, the BOD of the sludge is converted to methane. Products from the anaerobic digester also include solids that may be disposed of and a liquid stream. In the aerobic digester, part of the organics in the sludge is mineralised thus achieving the stabilisation and a reduction of the sludge to be disposed of.

Variations around this general process described above also exist.

Bioreactors used for treating primary effluent can consist of aerobic, anoxic and even anaerobic zones/conditions. Throughout this specification, the term "bioreactor for treating wastewater" is used to refer to any reactor in which microorganisms utilise or catalyse conversion of wastewater stream components into other components. The bioreactor may be an aerobic bioreactor, an anaerobic bioreactor or an anoxic bioreactor, or it may be operated under two or more such conditions (typically in sequence, but different zones of a bioreactor may operate under different conditions, for example, a top part of a bioreactor may be operating under aerobic conditions and a bottom part of the bioreactor may be operating under anaerobic conditions.

In a typical wastewater treatment plant, both biological nutrient removal and energy recovery require organic carbon. The requirement for high-level nutrient removal from wastewaters has often seen the abolishment of the primary settler, to satisfy the carbon demand for nutrient removal in the downstream processes of the wastewater treatment plant. However, abolishing the primary settler eliminates an energy rich stream for anaerobic digestion. This reduces the energy yield of the plant and renders energy recovery through anaerobic digestion economically infeasible for small to medium-sized wastewater treatment plants.

One reason for the high demand of organic carbon feed for nutrient removal is biomass production. In this regard, in the bioreactor for treating wastewater, the reactions that are taking place are typically biologically driven. As a result, the microorganisms that catalyse these reactions grow and a substantial amount of biomass is produced. These microorganisms assimilate a large amount organic carbon as biomass. Typically, 30 to 40% of the organic carbon fed to the bioreactor is assimilated by bacterial cells in the form of active bacterial cells and debris resulting from cell death and lysis, and is subsequently removed from the bioreactor as excess secondary sludge.

The secondary sludge is often supplied to an anaerobic digester in order to convert the BOD of the sludge to biogas containing methane. However, this large stream of secondary sludge, although containing large amounts of organic carbon, is poorly biodegradable. Pre-treatment of the sludge is often required to break up bacterial cell walls to make its carbon more available for the reactions in the anaerobic digester, such as methane production, or in another bioreactor for treating wastewater as an external carbon source for denitrification.

The proliferation of biological wastewater treatment plants (WWTPs) has brought about the production of an increasing amount of wastewater sludge, which is composed of primary sludge and secondary sludge. Anaerobic digestion is a favoured sludge destruction method to stabilise wastewater sludge prior to its disposal. In addition to achieving sludge stabilisation, anaerobic digestion also offers the opportunity to recover organics from a concentrated waste stream as a renewable bioenergy in the form of methane. The two basic properties that determine sludge destruction and methane production in anaerobic digestion are the hydrolysis rate and the degradation extent. Increasing either the kinetic hydrolysis rate or the inherent degradation extent will enhance methane production and therefore improve anaerobic digester performance.

Pre-treatment technologies (such as thermal, mechanical, chemical and biological attack) before anaerobic digestion have been developed to enhance anaerobic methane production altering the basic properties of sludge. For example, it has been demonstrated that the methane production of pretreated secondary sludge that was pretreated at 170° C. for 5 minutes was enhanced by 60%. Other workers have shown that temperature phased anaerobic digestion (TPAD) (thermophilic-mesophilic) achieved an increase of 16% in the methane production from secondary sludge compared to the single stage mesophilic anaerobic digestion. It has been suggested that enhanced methane production performance during TPAD was due to the increased hydrolysis rate while the inner inherent degradation extent was not affected.

However, most of the above-mentioned pre-treatment technology suffer from cost drawbacks due to substantial energy and/or chemical consumption and can cause negative environmental consequences due to increased carbon dioxide emissions.

US patent publication number 2010/0233777 in the name of Chandran et al describes a method of controlling a nitrification reaction in a biological nitrogen removal reactor to favour partial nitrification of ammonia to nitrite instead of complete oxidation of ammonia to nitrate. In this regard, nitrogen-containing compounds, primarily ammonia, are serious water pollutants that are coming under increasingly strict government regulation. This leads to the need for an efficient method for removing nitrogen from sewage. The typical nitrogen removal cycle employs bacteria to convert ammonia to nitrite and nitrate. During full nitrification, ammonium oxidising bacteria (AOB) oxidise ammonia to nitrite. Nitrite oxidising bacteria (NOB) then oxidise nitrite ($NO2-$) to nitrate ($NO3-$). The oxidation of nitrite to nitrate consumes 25% of the oxygen required for ammonium oxidation to nitrate. In the subsequent denitrification, nitrate is reduced to nitrite, and nitrite is further reduced to dinitrogen gas via nitric oxide and nitrous oxide. This process requires organic carbon as the electron donor. The amount of carbon required for nitrate reduction to nitrite represents 40% of that requires for full conversion of nitrate to dinitrogen gas.

In US 2010/0233777, methods of controlling a nitrification reaction in a biological nitrogen removal reactor to favour partial nitrification of ammonia to nitrite instead of complete oxidation of ammonia to nitrate are disclosed. In some embodiments the methods disclosed in this US patent application include maintaining a pH in the reactor within a range that promotes growth of ammonia oxidising bacteria, maintaining a concentration of dissolved oxygen in the reactor within a range that limits the ammonium oxidising bacteria from completing nitrification, selecting an operational solids retention time within a range suitable for maintaining increasing concentrations of the ammonia oxidising bacteria in the reactor while reducing concentrations of nitrite oxidising bacteria in the reactor, and increasing the concentration of free ammonia in the reactor thereby inhibiting growth of the nitrite oxidising bacteria in the reactor.

As explained at paragraph [0016] of US 2010/0233777, partial nitrification results from selective proliferation of ammonia oxidising bacteria (AOB) over nitrite oxidising bacteria (NOB). Systems and methods according to the disclosed subject matter include BNR reactor operating parameters that facilitate the proliferation of AOB over NOB and thus facilitate partial nitrification. To limit the oxidation of nitrite to nitrate and thus help AOB concentration in a BNR reactor to build, low dissolved oxygen concentrations are maintained during nitrification, which serves to prevent AOB bacteria from completing nitrification because AOB typically have a higher affinity for oxygen than NOB. In addition, the BNR reactor is operated with an operational solids retention time (SRT) that facilitates selective NOB washout. As the AOB begins to dominate over the NOB, higher free ammonia (FA) concentrations are found, which helps to further inhibit NOB growth.

In specific embodiments disclosed in US 2010/0233777, the pH is controlled in the reactor to about 7.4 to 7.6 so as to promote growth of ammonia oxidising bacteria. The pH may be controlled, for example, by adding chemicals for adjusting pH, such as sodium bicarbonate. The range of dissolved oxygen in the reactor is controlled to about 0.6 to 2.5 mg $O_2$/L (ppm). These are the only specific ranges of values provided for pH and dissolved oxygen in US 2010/0233777.

Piculell et al, "The inhibitory effects of reject water on nitrifying populations grown in different biofilm thickness", Water Research 104 (2016) 292-302, describes a study in which biofilm carriers from a fully nitrifying MBBR system fed with mainstream wastewater were temporarily exposed to reject water from sludge dewatering, to evaluate this as a possible strategy to inhibit NOB and achieve nitrite production under realistic conditions. Reject exposure almost always resulted in an increased nitrite production in a biofilm. The effect from reject exposure remained in the systems for 4 days after returning to mainstream operation. Increased concentrations of free ammonia correlated with reject exposure may be the cause of inhibition, although other factors cannot be excluded.

Piculell states that both AOB and NOB can be inhibited by FA (free ammonia) and FNA (free nitrous acid), with NOB generally being more sensitive, and by achieving FA or FNA at the appropriate level of exposure it may be possible to suppress only NOB. However, this level is not obvious, with many different results reported in the literature. In addition, the inhibitory effect of a certain bulk concentration of FA or FNA on NOB in a larger aggregate may differ from that in a biofilm. Different inhibitory effects have been observed in studies on activated sludge, biofilms and pure cultures and nitrifiers are potentially more sensitive to inhibition in small aggregates and thinner biofilms than in larger clusters.

In the inhibition trials conducted in Piculell, the fully nitrifying biofilms from the pilot reactor were exposed to reject water from sludge dewatering at different loading rates. Each inhibition trial was initiated with 3 to 4 days of continuous operation at mainstream operating conditions, whether reactors were fed with the same mainstream HRAS effluent as the pilot plant (19 to 34 mg $NH_4$—N/L) at 20° C., after which the feed was switched to municipal reject water (870 to 1010 mg $NH_4$—N/L) and temperature was increased to 30° C. After 1 to 2 days of reject exposure, the reactors were returned to mainstream conditions and operated for an additional 2 to 4 days. Dissolved oxygen concentrations remained relatively stable throughout the trials (5.8±0.8 and 5.2±0.9 gm/L during mainstream and reject operation, respectively). pH varied as a result of varying feeding rate, load and activity in the reactors (7.6±0.2 and 8.1±0.7 during mainstream and reject operation, respectively).

It appears that although pH was monitored in Piculell, it was not controlled in any way. Piculell does not discuss adding alkaline materials, such as sodium hydroxide or sodium carbonate, to control pH. The results given in Piculell showed that the maximum FA (mg $NH_3$—N/L) ranged from 0.60 to 272 mg/L. Piculell found that the success of the treatment clearly relied on having thin biofilms; the positive effect on nitrite production was higher and occurred more often in biofilms having a thickness of 50 μm than in biofilms having a thickness of 400 μm where nitrite production was negligible. Piculell also found that although nitrite production increased after reject exposure, a complete elimination of NOB activity could not be achieved without affecting AOB. Piculell speculated that it may be possible that repeated exposure to reject water could result in suppression of NOB even in fully nitrifying biofilms and repeated exposure to reject water might indeed result in and gradually increase suppression of NOB in biofilms. Based on the present study, Piculell suggested that a possible treatment strategy to convert fully nitrifying biofilms to efficient nitritation would be repeated exposure to reject water approximately every third day at a specified reject exposure time. However, Piculell also cautioned that repeated disturbances to the system could also result in a population shift towards a more resilient community, which could disfavour the nitrite production.

In discussing the causes of inhibition, Piculell stated that previous studies have shown a significant negative impact on both AOB and NOB activity at pH exceeding 8, suggesting that the elevated pH observed in this study may have caused inhibition. But since changes in pH are strongly correlated with TAN (total ammonium nitrogen), it is not possible to separate the individual effect of pH from possible effect of FA. By increasing the reject exposure, it was possible to attain FA concentrations which considerably exceeded previously observed inhibiting values. It is hence possible that elevated FA was the major cause of inhibition in the study. NOB inhibition has previously been noted at FA below 1 mg $NH_3$—N/L, while AOB inhibition has been noted at 10 to 150 mg $NH_3$—N/L. It has hence been suggested that the ideal operational rage for nitrite accumulation is at 5 to 10 mg $NH_3$—N/L. In this study, however, both AOB and NOB were seemingly unaffected after being exposed to FA as high as 100 mg $NH_3$—N/L in biofilms having a thickness of 400 μm. For 50 μm thick biofilms, however, AOB and NOB were more sensitive, with a gradually declining activity when FA exceeded 50 mg $NH_3$—N/L. These results suggest that a considerably higher concentration of FA is needed to suppress both AOB and NOB in biofilms compared to suspended biomass, and that thick biofilms are less sensitive than thinner ones to inhibition.

It will be clearly understood that, if a prior art publication is referred to herein, this reference does not constitute an admission that the publication forms part of the common general knowledge in the art in Australia or in any other country.

SUMMARY OF INVENTION

The present invention is directed to a method for treating a sludge and to a method for treating sewage or wastewater, which may at least partially overcome at least one of the abovementioned disadvantages or provide the consumer with a useful or commercial choice.

With the foregoing in view, the present invention in one form, resides broadly in a method for treating a sludge derived from sewage or wastewater, the method comprising subjecting the sludge to a treatment step at a pH of 8.9 or greater and a free ammonia (FA) content of 100 mg $NH_3$—N/L or greater.

In one embodiment, the sludge comprises a secondary sludge from a secondary settler or from a bioreactor for treating sewage or wastewater. In another embodiment, the sludge comprises a primary sludge from a sewage or wastewater treatment plant. The primary sludge may comprise a primary sludge collected from a primary settler or a sludge collected from a screen.

In one embodiment, the pH in the treatment step is from 8.9 to 10.5, or from 8.9 to 10.0, or from 8.9 to 9.5, or from 9.0 to 9.5, or from 9.1 to 9.5, or from 9.2 to 9.5, or from 9.3 to 9.5, or about 9.3.

In one embodiment, the FA concentration in the treatment step ranges from 100 to 1000 mg $NH_3$—N/L, or from 250 to 1000 mg $NH_3$—N/L, or from 250 to 900 mg $NH_3$—N/L, or from 250 to 800 mg $NH_3$—N/L, or from 250 to 700 mg $NH_3$—N/L, or from 250 to 680 mg $NH_3$—N/L, or from 400 to 700 mg $NH_3$—N/L, or from 420 to 680 mg $NH_3$—N/L.

In the method of the present invention, the pH is controlled to fall within the specified range. The pH may be controlled by monitoring the pH and adding an alkaline agent if the pH drops below 8.9. The alkaline agent may comprise sodium hydroxide, sodium carbonate, calcium hydroxide, or any other alkaline agent that can increase pH to 8.9 or greater. In one embodiment, the free ammonia content specified in the treatment step is obtained by adding a liquid containing dissolved ammonium ($NH_4^+$) having a concentration such that at the pH of the treatment step, the desired free ammonia concentration is achieved in the treatment reactor. In some embodiments, the liquid containing dissolved ammonium has a dissolved ammonium concentration of from 0.5 to 4 g/L $NH_4^+$—N, or from 1.0 to 3.0 g/L $NH_4^+$—N, or from 1.0 to 2.0 g/L $NH_4^+$—N. The liquid containing dissolved ammonium may comprise liquor removed from an anaerobic digestion process. In other embodiments, ammonium may be purchased from a commercial supplier. In these embodiments, the concentration of ammonium added may be much higher (thereby allowing a smaller volume of liquid containing ammonium to be added).

In one embodiment, the liquid containing dissolved ammonia comprises an anaerobic digestion liquor.

In some embodiments, the sludge may have a residence time in the reactor where it is contacted with free ammonia from 2 hours to 1 week, or from 4 hours to 48 hours, or from 6 hours to 24 hours. In practice, the treatment time is likely to be set by the operational parameters of the particular wastewater treatment plant.

In some embodiments, treatment of the sludge with free ammonia will occur on a continuous basis, especially in embodiments where the sludge is being fed to a downstream reactor where methane is being produced (such as an anaerobic digester). In one embodiment, anaerobic liquor could be fed continuously to the reactor and alkali addition could occur when the pH drops below the minimum value.

In other embodiments, particularly those where the treatment is primarily directed towards washing out NOB, treatment of the sludge could be on an intermittent basis. For example, the sludge may be treated with free ammonia at the stated pH for a period of from 2 hours to 7 days, followed by a non-treatment period of from 1 day to 3 months, or from 1 day to 1 month, or from 7 days to 1 month.

In some embodiments, if the liquid containing dissolved ammonium has a relatively lower concentration of dissolved ammonium, a higher pH may be used in the treatment step to obtain the desired free ammonia concentration. If the liquid containing dissolved ammonium has a relatively higher concentration of dissolved ammonium, a lower pH may be used in the treatment step to obtain the desired free ammonia concentration. However, the minimum pH used in the treatment step should be 8.9.

In one embodiment, the sludge that is treated in the present invention is sent to an anaerobic digester, the anaerobic digester forming methane. In this embodiment, the present inventors have found that the production of methane is greatly enhanced by the treatment of the sludge prior to feeding the sludge to the anaerobic digester.

In an embodiment of the present invention, the sludge that is treated in the treatment step is sent to an anaerobic digester, the anaerobic digester forming methane and an anaerobic digestion liquor, at least part of the anaerobic digestion liquor being returned to the treatment step. This is advantageous in that the anaerobic digestion liquor will contain dissolved ammonium that subsequently forms free ammonia at the pH conditions present in the treatment step. Therefore, in this embodiment, it may not be necessary to provide a separate source of ammonium or ammonia for supply to the treatment step. Effectively, the required ammonia content can be generated by the anaerobic digestion step of the overall sewage treatment method or wastewater treatment method. In this embodiment, the only additional chemical that needs to be purchased, or produced on-site, for adding to the treatment step is an alkaline agent to obtain the desired pH conditions in the treatment step.

In one embodiment, the method of the present invention comprises feeding a wastewater or sewage to a bioreactor, obtaining a secondary sludge from the bioreactor, treating the secondary sludge at a pH of 8.9 or greater and a free ammonia (FA) content of 100 mg $NH_3$—N/L or greater to obtain a treated secondary sludge, feeding the treated secondary sludge to an anaerobic digester to form methane and an anaerobic digestion liquor and passing at least some of the anaerobic digestion liquor to the step of treating the secondary sludge.

In one embodiment, the secondary sludge is thickened prior to the step of treating the secondary sludge with free ammonia. Conventional thickening techniques may be used. By thickening the secondary sludge, a smaller volume of material is fed to the free ammonia treatment step, thereby allowing for smaller vessels or tanks to be used, which reduces capital costs. Further, as a small volume of material is being treated, less alkaline agent is likely to be required to obtain the desired pH level. The sludge could be thickened to a solids level in the range of from 2% to 15% by weight, or from 4% to 8% by weight.

In another embodiment, the method comprises obtaining a primary sludge from sewage or wastewater, treating the primary sludge at a pH of 8.9 or greater and a free ammonia (FA) content of 100 mg $NH_3$—N/L or greater to form a treated sludge, feeding the treated sludge to an anaerobic digester to form methane and an anaerobic digestion liquor and returning at least some of the anaerobic digestion liquor to the primary sludge treatment step.

In one embodiment, the primary settler forms a sludge stream and a liquid stream, the liquid stream being fed to a bioreactor to form a secondary sludge, the secondary sludge also being fed to the anaerobic digester. In one embodiment, part of the anaerobic digestion liquor is mixed with the wastewater or sewage in the primary settler or upstream of the primary settler.

In all embodiments of the present invention that involve feeding a treated sludge to an anaerobic digester, an anaerobic digester sludge is formed in the anaerobic digester. The anaerobic digester sludge may form a disposal stream that can be disposed of. Desirably, the effluent leaving the anaerobic digester is subject to a dewatering step to form the anaerobic digestion liquor and the dewatered anaerobic digester sludge.

It has previously been reported (Belmonte, M., Hsieh, C., Figueroa, C., Campos, J., Vidal, G., 2011. Effect of free ammonia nitrogen on the methanogenic activity of swine wastewater. Electron. J. Biotechn. 14 (3), 2-2) that methanogenic activity was inhibited by 80% at a free ammonia concentration of 40 mg $NH_3$—N/L. Thus, it may be somewhat surprising that using the significantly higher free ammonia concentration in the sludge treatment step of the present invention does not retard or restrict subsequent methane production from the treated sludge in the anaerobic digester.

In embodiments of the present invention where the treated sludge is fed to an anaerobic digester, the anaerobic digester may be of any conventional design and operation.

In a second aspect, the present invention provides a method for producing methane comprising the steps of feeding a sludge to an anaerobic digester or an anaerobic reactor to form methane, characterised in that the sludge has been treated at a pH of 8.9 or greater and a free ammonia (FA) content of 100 mg $NH_3$—N/L or greater prior to feeding to the anaerobic digester or anaerobic reactor.

The sludge may comprise a primary sludge or may comprise a secondary sludge. Other conditions described with reference to the first aspect of the present invention are equally applicable to the second aspect of the present invention.

In one embodiment of the second aspect of the present invention, the sludge that has been subjected to the FA treatment step has a residence time in the anaerobic digester or anaerobic reactor of from 5 days to 50 days, or from 7 days to 40 days, or from 10 days to 30 days.

In a third aspect, the present invention provides a process for treating wastewater comprising treating a sludge obtained from wastewater at a pH of 8.9 or greater and a free ammonia (FA) content of 100 mg $NH_3$—N/L or greater, passing treated sludge to an anaerobic digester, removing an effluent stream from the anaerobic digester, separating an anaerobic digestion liquor from the effluent stream and returning at least part of the anaerobic digestion liquor to the step of treating the sludge at a pH of 8.9 or greater and a free ammonia (FA) content of 100 mg $NH_3$—N/L or greater.

In one embodiment, the sludge that is being treated in the free ammonia treatment step comprises a secondary sludge from a bioreactor.

In one embodiment, the sludge that is being treated in the free ammonia treatment step comprises a primary sludge.

In another embodiment, the sludge that is being treated in the free ammonia treatment step comprises a mixture of primary sludge and secondary sludge.

In one embodiment, methane is produced in the anaerobic digester. The methane may be used as an energy source that may be recovered and stored for later use.

In a fourth aspect, the present invention provides a process for treating wastewater comprising the steps of treating wastewater or wastewater sludge in a bioreactor, passing part or all of a secondary sludge generated in the bioreactor to an anaerobic digester, treating another part of the secondary sludge produced in the bioreactor at a pH of 8.9 or greater and a free ammonia (FA) content of 100 mg $NH_3$—N/L or greater, and forwarding treated sludge to the bioreactor.

In one embodiment of this aspect of the present invention, an anaerobic digestion liquor is removed from the anaerobic digester and part of the anaerobic digestion liquor is passed to the free ammonia treatment step. Some of the anaerobic digestion liquor may also be returned to the bioreactor.

In some embodiments, this aspect of the present invention is effective to select AOB over NOB in the bioreactor, thereby resulting in denitrification occurring via the nitrite pathway, also called the nitrite shunt, rather than via the nitrate pathway.

The process for treating wastewater in accordance with the present invention may include a number of other conventional steps, such as primary separation of solids from the wastewater, treating the wastewater in a bioreactor and recovering a secondary sludge from the bioreactor, treating the primary sludge or the secondary sludge by increasing its solids concentration (such as by clarification or thickening), returning secondary sludge to a bioreactor that treats wastewater, dewatering the effluent from the anaerobic digester to produce the anaerobic digester liquor and an anaerobic digester sludge, and disposing of the anaerobic digester sludge.

The process for treating wastewater in accordance with the present invention may be easily incorporated into existing wastewater treatment plants.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

FIG. 3 (left-hand side) shows the enlargement of the first 8 days in example 1;

FIG. 8A showed an enlargement of the first 8 days. Error bars represent standard errors of triplicate tests.

DESCRIPTION OF EMBODIMENTS

Figure 1:
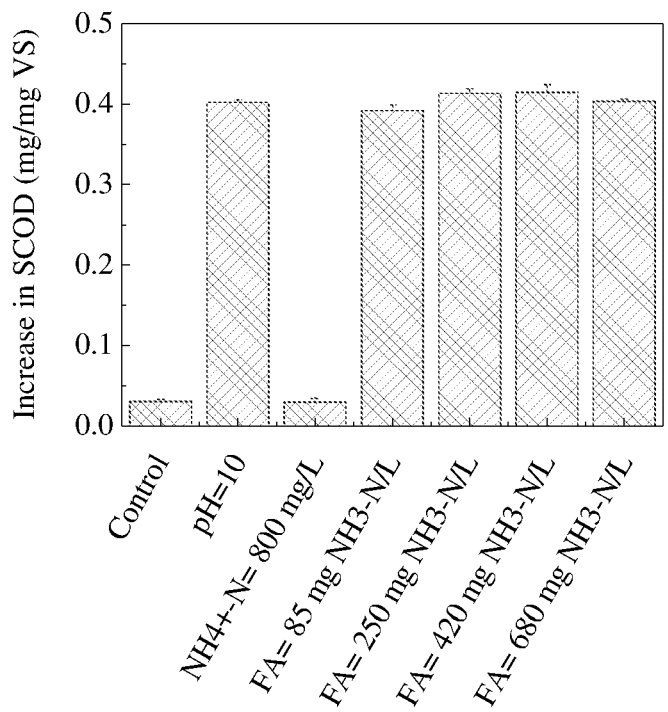
FIG. 1 shows a graph showing the increase in SCOD following 24 h pre-treatment of secondary sludge using FA (85-680 mg $NH_3$—N/L), alkaline (pH=10) and ammonium (800 mg $NH_4^+$—N/L) in example 1.

The skilled person will appreciate that the drawings have been provided for the purposes of illustrating preferred embodiments of the present invention. Therefore, it will be understood that the present invention should not be considered to be limited solely to the features as shown in the attached drawings.

EXAMPLE 1

This example relates to a method in accordance with one embodiment of the present invention for treating a secondary sludge.

Both secondary sludge and inoculum were used to conduct the experiments. Secondary sludge was harvested from the thickened sludge of a biological nitrogen and phosphorus removal WWTP in Brisbane, whose sludge retention time (SRT) was 15 d. Secondary sludge was used as the substrate. Inoculum was obtained from an anaerobic digester receiving mixed primary and secondary sludge in the same WWTP as that secondary sludge was collected. The mesophilic anaerobic digester has an SRT of 15-18 d. The inoculum was employed to biodegrade the secondary sludge. The primary properties of secondary sludge and inoculum were shown in Table 1.

TABLE 1

Primary properties of secondary sludge and inoculum.

| Parameter | Secondary sludge | Inoculum |
|---|---|---|
| Total solids (TS) (g/L) | 43.0 ± 0.2 | 28.6 ± 0.1 |
| Volatile solids (VS) (g/L) | 35.3 ± 0.2 | 22.4 ± 0.1 |
| Total chemical oxygen demand (TCOD) (g/L) | 49.1 ± 0.5 | 29.2 ± 0.2 |
| Soluble chemical oxygen demand (SCOD) (g/L) | 0.4 ± 0.1 | 0.8 ± 0.1 |
| pH | 6.9 ± 0.1 | 8.0 ± 0.1 |

A series of batch experiments were conducted to evaluate the impact of FA, alkaline and ammonium pre-treatment conditions on the solubilisation of secondary sludge. 3.5 L of secondary sludge was added to 7 batch reactors (0.5 L each). For FA pre-treatment, different volumes of ammonium stock solution (3.0 M) were added to 4 batch reactors to obtain the ammonium concentrations of 100, 300, 500 and 800 mg $NH_4^+$—N/L, respectively, as shown in Table 2. These ammonium concentrations could be obtained on site from the anaerobic digestion liquor of the WWTPs in the real application. pH was maintained at 10.0±0.1 using NaOH solution. The ammonium together with the pH condition adopted above resulted in FA concentrations between 85 and 680 mg $NH_3$—N/L (Table 2). The FA concentration was determined by the formula $S_{(NH_4^+ - N + NH_3 \_ N)} \times 10^{pH}/(K_b/K_w + 10^{pH})$, in which the $K_b/K_w$ value was determined using the formula $K_b/K_w = e^{6,344/(273+T)}$ (Anthonisen et al., 1976). All batch reactors were maintained at around 25° C. Alkaline pre-treatment was conducted at pH 10.0 in the absence of external ammonium addition (Table 2) Ammonium pretreatment was performed at 800 mg $NH_4^+$—N/L (Table 2), which was the highest ammonium concentration used in the FA pre-treatment. pH control was not performed and a pH of around 6.9 was recorded, leading to a quite low FA concentration of 4 mg $NH_3$—N/L. The alkaline and ammonium pre-treatment tests were conducted to evaluate whether the enhanced methane production was due to alkaline or ammonium pre-treatment. Another batch reactor (i.e. control) was also set up in the absence of pH control or ammonium addition (Table 2). The magnetic stirrers were used to mix all the reactors. All tests lasted for 24 h.

TABLE 2

Pre-treatment conditions employed in this study[a].

| Pre-treatment | FA (mg $NH_3$—N/L) | $NH_4^+$—N (mg N/L) | pH |
|---|---|---|---|
| Control | 0.04 | 8[b] | 6.9[b] |
| FA | 85 | 100 | 10 |
|  | 250 | 300 | 10 |
|  | 420 | 500 | 10 |
|  | 680 | 800 | 10 |
| Alkaline | 7 | 8[b] | 10 |
| $NH_4^+$ | 4 | 800 | 6.9[b] |

[a]Temperature was room temperature (25° C.) in all tests. Pre-treatment time was 24 h.
[b]8 mg $NH_4^+$—N/L and pH 6.9 were the ammonium concentration and pH value in the raw secondary sludge In every set, the VS, TS and SCOD concentrations were determined three times both prior to and after pre-treatment and the solubilisation of secondary sludge was expressed as the SCOD release divided by the VS of secondary sludge.

Methane that secondary sludge produced with FA, alkaline and ammonium pre-treatment was evaluated by biochemical methane potential (BMP) tests, which were detailed in Wang et al. (2013). The serum vials (160 mL) with a working volume of 100 mL were used to carry out the BMP tests. 80 mL inoculum with 20 mL secondary sludge was added to every BMP test vial, leading to a VS-based inoculum to secondary sludge ratio of 2.0±0.1. The pH of secondary sludge with FA and alkaline pre-treatment was adjusted to 6.9 (i.e. pH in the control reactor) using 1 M HCl before the secondary sludge was added to the BMP test vial. Nitrogen gas (at 1 L/min) was used to flush the vials for around 2 min to ensure anaerobic condition. After that, a rubber stopper with aluminium crimp cap was used to seal the vials, which were then put in an incubator operated at 35° C. Blank was also operated, which only contained the same volume of MilliQ water and inoculum (i.e. without secondary sludge). Triplicate tests were conducted. The BMP assays lasted for 50 days until biogas production decreased to a negligible level.

The biogas (i.e. $H_2$, $CH_4$, $CO_2$) composition and production were recorded every day in the first 7 d and in a 2-6 days' interval afterwards. The volume of methane was determined by multiplying the volume of biogas by the percentage of methane in biogas and calculated as the value at standard pressure and temperature (1 atm, 25° C.). The methane production from secondary sludge was determined by subtracting methane production in the test vial (i.e. with secondary sludge) from that in the blank vial (i.e. without secondary sludge). The methane production was recorded as methane volume divided by VS mass (L $CH_4$/kg VS).

The methane production potential and kinetics of the secondary sludge were assessed by biochemical methane potential ($B_0$) and hydrolysis rate (k). They were determined by using the first order kinetic model to fit the methane production data obtained from BMP assays. A modified Aquasim 2.1d was used. The objective function was the sum of squared errors ($J_{opt}$) (Batstone et al., 2003). The uncertainty surfaces of $B_0$ and k were also estimated by the Aquasim 2.1d on the basis of a model-validity F-test with 95% confidence limits (Batstone et al., 2003).

Two types of models were employed in this study. The first employed a one substrate model with only one substrate type considered (Wang et al., 2013; Rao et al., 2000) (equation (1)):

$$B(t)=B_0(1-e^{-kt}) \quad (1)$$

where B(t) is biochemical methane production at a given time t (L $CH_4$/kg VS); t is time (d).

The second employed a two substrate model (equation (2)), which divided the secondary sludge samples into both a rapidly biodegradable substance and a slowly biodegradable substance (Wang et al., 2013; Rao et al., 2000). This aims to assess how the pre-treatment affects the rapidly biodegradable substances and slowly biodegradable substances, respectively.

$$B(t)=B_{0,rapid}(1-e^{-k_{rapid}t})+B_{0,slow}(1-e^{-k_{slow}t})$$

where $B_{0,rapid}$ is biochemical methane potential of rapidly biodegradable substances (L $CH_4$/kg VS added); $B_{0,slow}$ is biochemical methane potential of slowly biodegradable substances (L $CH_4$/kg VS added); $k_{rapid}$ is hydrolysis rate of rapidly biodegradable substances ($d^{-1}$); $k_{slow}$ is hydrolysis rate of slowly biodegradable substances ($d^{-1}$).

The degradation extent (Y) of secondary sludge was evaluated using $B_0$, by equation (3):

$$Y=B_0/380 \times R_{SS} \quad (3)$$

where $B_0$ is biochemical methane potential of secondary sludge (L $CH_4$/kg VS added); 380 is theoretical biochemical methane potential of secondary sludge at standard conditions (25° C., 1 atm) (L $CH_4$/kg TCOD) (Metcalf and Eddy, 2003); $R_{SS}$ is measured percentage of VS to TCOD of secondary sludge in this study (i.e. 0.72).

Millipore filter units with a 0.45 μm pore size were used to filter the secondary sludge samples for the measurement of $NH_4^+$—N and SCOD. The $NH_4^+$—N concentration was determined by a Lachat QuikChem8000 Flow Injection Analyzer. The VS, TS, SCOD and TCOD concentrations were measured based on the standard methods.

The volume of biogas was tested by a manometer at the start of each sampling event. A manometer was used to measure the volume of biogas at the beginning of every sampling event. The volume of generated gas was determined based on the pressure increase in the headspace of the BMP test vials and recorded at standard conditions (1 atm, 25° C.). Biogas composition (i.e. $CH_4$, $CO_2$ and $N_2$) was measured by a Perkin Elmer autosystem gas chromatograph equipped with a thermal conductivity detector (GC-TCD).

RESULTS—EXAMPLE 1

Impact of FA pre-treatment on secondary sludge solubilisation—FIG. 1 demonstrates the solubilisation of secondary sludge after FA (85-680 mg $NH_3$—N/L), alkaline (pH=10) and ammonium (800 mg $NH_4^+$—N/L) pre-treatment for 24 h. In general, FA and alkaline pre-treatment caused increased (p<0.05) SCOD release, whereas ammonium pre-treatment did not play a role (p>0.05) in SCOD release in comparison to the control. As for control (without adding ammonium or adjusting pH, Table 2) and ammonium pre-treated secondary sludge, SCOD only rose by approximately 0.03 mg SCOD/mg VS. In comparison, SCOD increased by around 0.4 mg SCOD/mg VS with FA treatment at all the tested FA concentrations (i.e. 85-680 mg $NH_3$—N/L), which resulted in a 10 times higher solubilisation of secondary sludge compared with the control and ammonium treatment. The increased SCOD release (0.4 mg SCOD/mg VS) in the scenario of alkaline pre-treatment (pH=10) was comparable (p>0.05) with that in the case of FA pre-treatment. More SCOD release reveals that more extracellular polymeric substances (EPS) and/or cells were destructed and formed soluble substances from particulate substances.

Figure 2:
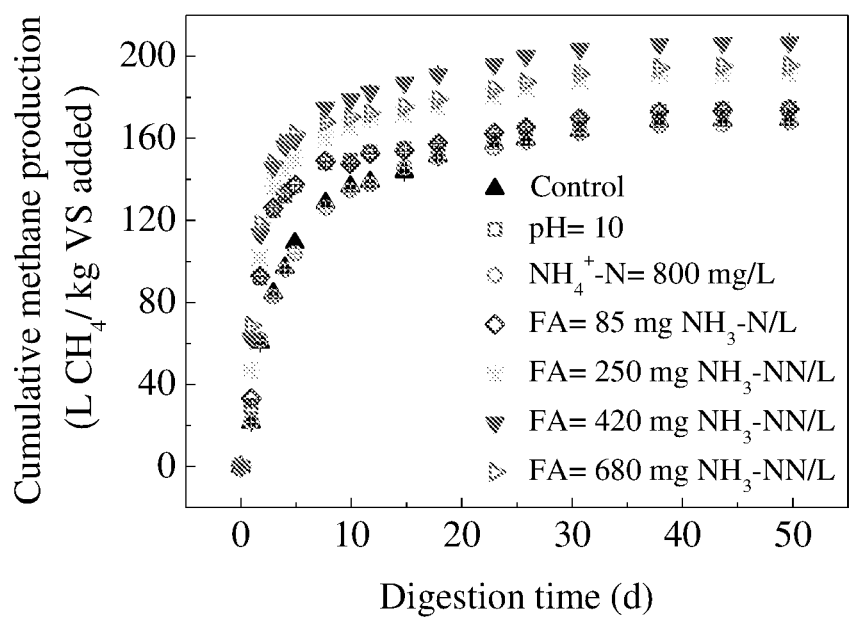
FIG. 2 shows a graph of cumulative methane production from secondary sludge with FA (85-680 mg $NH_3$—N/L), alkaline (pH=10) and ammonium (800 mg $NH_4^+$—N/L) pre-treatment in example 1.

Impact of FA pre-treatment on biochemical methane production—FIG. 2 shows the measured methane production during the entire BMP assay period (i.e. 50 days) in all tests. On the whole, FA pre-treatment at 250-680 mg $NH_3$—N/L attained higher (p<0.05) methane production compared with control during the whole period, with the highest methane production achieved at an FA level of 420 mg $NH_3$—N/L. In comparison, the cumulative biochemical methane production from secondary sludge with FA pre-treatment (85 mg $NH_3$—N/L) and with pH 10 pre-treatment were only enhanced (p<0.05) when the digestion time was less than 18 d and were comparable (p>0.05) to the control afterwards. Interestingly, FA pre-treatment at 85 mg $NH_3$—N/L (pH 10 at 100 mg $NH_4^+$—N/L) and alkaline pre-treatment at pH 10 achieved similar (p>0.05) methane production, indicating that the enhanced methane production by FA pre-treatment of 85 mg $NH_3$—N/L was probably attributed to the pH 10 pre-treatment alone. However, FA pre-treatment at 250-680 mg $NH_3$—N/L (pH 10 at 300-800 mg $NH_4^+$—N/L) achieved higher (p<0.05) methane production than pH 10 pre-treatment by itself. In addition, ammonium pre-treatment (800 mg $NH_4^+$—N/L) achieved similar (p>0.05) methane production in comparison with control, indicating ammonium pre-treatment did not play a role in the enhancement of methane production. These revealed that FA pre-treatment at a higher concentration (e.g. >250 mg $NH_3$—N/L) is effective in enhancing methane production from secondary sludge and the improved methane production was due to FA rather than pH or ammonium alone.

Estimation of biochemical methane potential and hydrolysis rate—two main parameters (i.e. biochemical methane potential ($B_0$) and first order hydrolysis rate (k)) were determined by two models (i.e. one substrate model and two substrate model).

Figure 3:
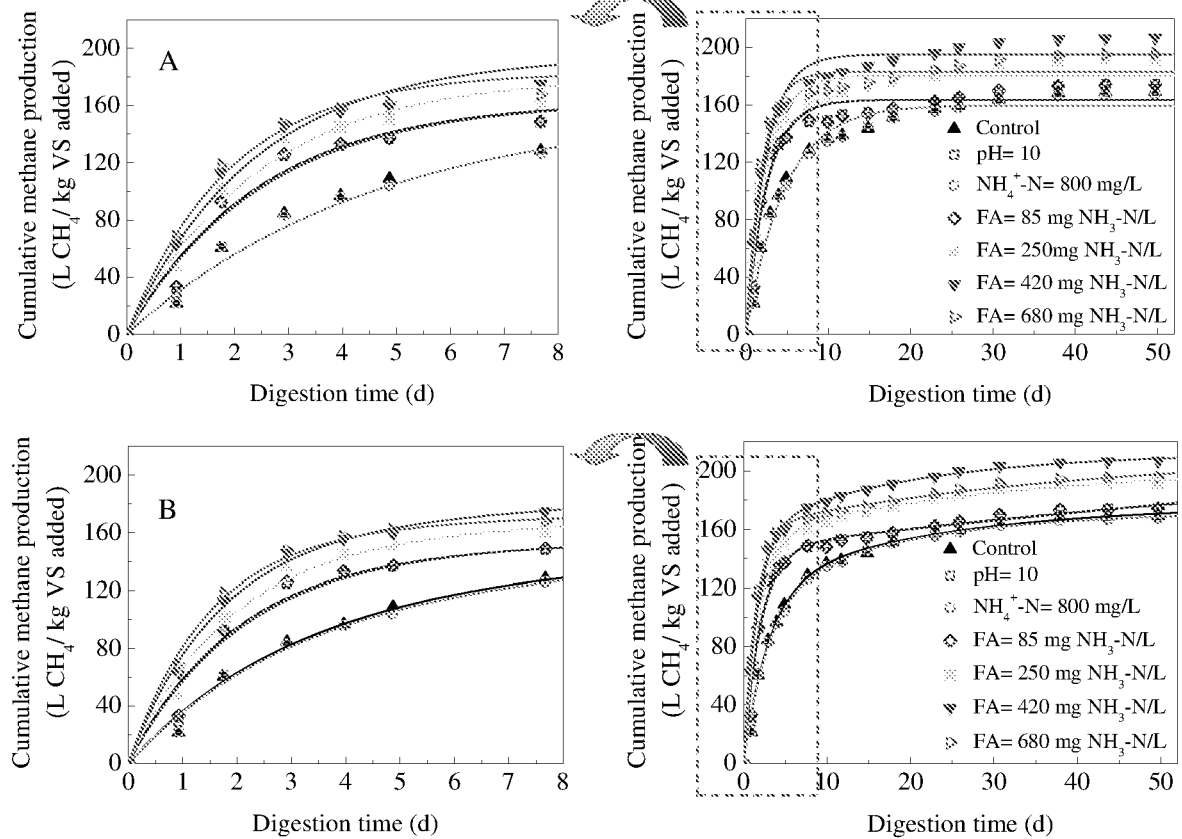
FIG. 3 shows graphs of measured and simulated biochemical methane production curves by model fit (A): using one-substrate model; (B): using two-substrate model (symbols represent experimental measurements and lines represent model fit.
Figure 4:
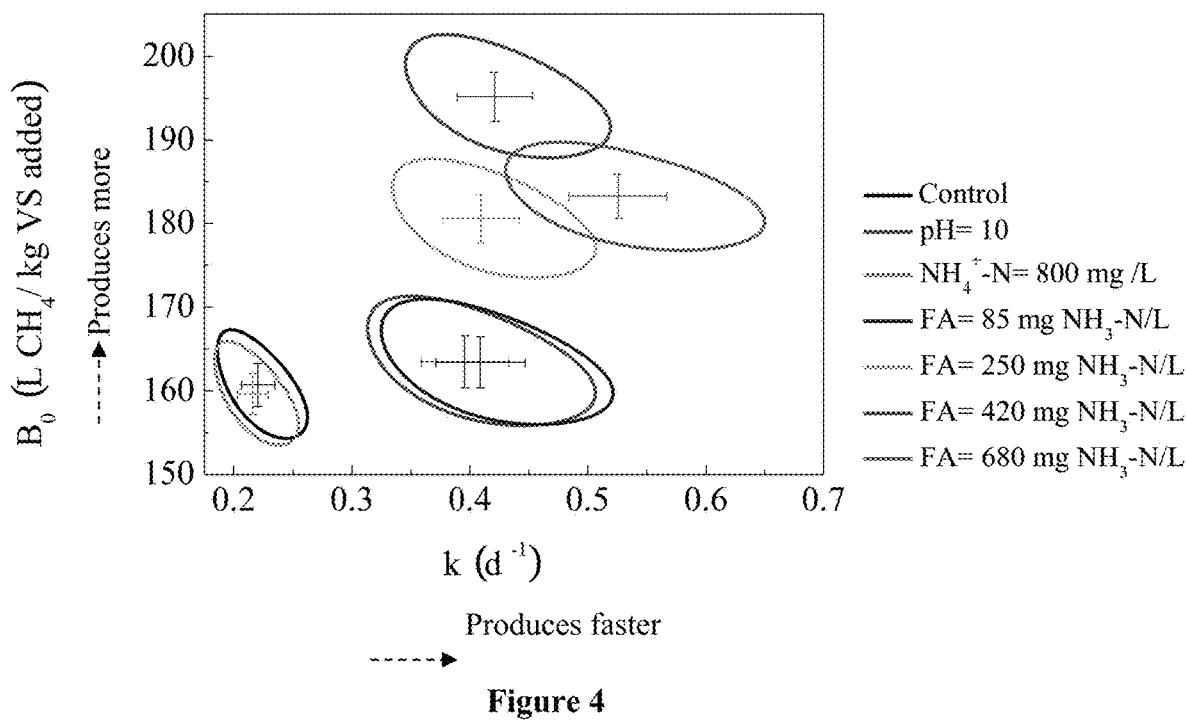
FIG. 4 shows a graph of 95% confidence regions for hydrolysis rate (k, $d^{-1}$) and biochemical methane potential ($B_0$, L $CH_4$/kg VS added) in various pre-treatment system in example 1.

One substrate model—FIG. 3A shows the simulated biochemical methane production profiles by one substrate model, which reveals the satisfactory fit of methane production data to this model. The determined $B_0$ and k and 95% confidence regions for them with FA, alkaline and ammonium pre-treatment are shown in Table 3 and FIG. 4. On the whole, FA pre-treatment at >250 mg $NH_3$—N/L achieved higher (p<0.05) $B_0$ and k compared with the control. When the FA concentrations were between 420 and 680 mg $NH_3$—N/L, the highest increase in $B_0$ and k was attained, which was determined as approximately 22% (from 160 to 195 L $CH_4$/kg VS added) and 140% (from 0.22 to 0.53 $d^{-1}$) in comparison with the secondary sludge without pre-treatment. This trend was also clearly demonstrated in FIG. 4. At the same time, Y increased from 0.30 to 0.36 $d^{-1}$ as well after the secondary sludge was pre-treated at an FA level of 420 mg $NH_3$—N/L (Table 3). This indicates FA pre-treatment at >250 mg $NH_3$—N/L could enhance k, $B_0$ and Y. In contrast, FA pre-treatment at 85 mg $NH_3$—N/L and alkaline pre-treatment at pH 10 did not affect (p>0.05) $B_0$ significantly and had a similar effect (p<0.05) on k (also see FIG. 4), which was enhanced by around 85% (from 0.22 to 0.41 $d^{-1}$). However, ammonium pre-treatment at 800 mg $NH_4^+$—N/L did not play a role (p>0.05) in both k and $B_0$.

TABLE 3

Determined hydrolysis rate (k), biochemical methane potential ($B_0$) and degradation extent (Y) of secondary sludge at different FA concentrations using one-substrate model

| Pre-treatment[a] | k ($d^{-1}$) | $B_0$ (L $CH_4$/kg VS added) | Y |
|---|---|---|---|
| Control | 0.22 ± 0.01 | 160 ± 3 | 0.30 ± 0.01 |
| FA 85 | 0.41 ± 0.03 | 163 ± 3 | 0.30 ± 0.01 |
| FA 250 | 0.41 ± 0.03 | 181 ± 3 | 0.34 ± 0.01 |
| FA 420 | 0.42 ± 0.03 | 195 ± 3 | 0.36 ± 0.01 |
| FA 680 | 0.53 ± 0.04 | 183 ± 3 | 0.34 ± 0.01 |
| pH 10 | 0.40 ± 0.04 | 163 ± 3 | 0.30 ± 0.01 |
| $NH_4^+$—N 800 | 0.22 ± 0.01 | 160 ± 2 | 0.30 ± 0.01 |

Two substrate model—FIG. 3B shows the simulated biochemical methane production profiles by two substrate model, which reveals that methane production was well captured. This result indicates that the composition of secondary sludge was in a heterogeneous form. Table 4 shows the determined values of $B_{0,rapid}$, $k_{rapid}$, $Y_{rapid}$, and $B_{0,slow}$, $k_{slow}$, $Y_{slow}$. On the whole, FA pre-treatment at >250 mg $NH_3$—N/L led to increased (p<0.05) $k_{rapid}$, $B_{0,rapid}$ and $Y_{rapid}$ although parameter identification was poor in the cases of 85 mg $NH_3$—N/L and pH 10 (see diagonal region in Table 4). They increased from 121 L $CH_4$/kg VS added, 0.33 $d^{-1}$ and 0.22, respectively, for the untreated secondary sludge, to 155-161 L $CH_4$/kg VS added, 0.54-0.68 $d^{-1}$ and 0.29-0.30, respectively, at FA levels of 250-680 mg $NH_3$—N/L. This reveals that biochemical methane potential, hydrolysis rate and degradation extent of the rapidly biodegradable substances were significantly affected by FA pre-treatment. Nevertheless, $B_{0,slow}$, $k_{slow}$ and $Y_{slow}$ did not change significantly (p>0.05) with the changed FA concentration. The result indicates that FA pre-treatment did not significantly affect the slowly biodegradable substances.

TABLE 4

Determined $k_{rapid}$, $B_{0rapid}$, $Y_{rapid}$ and $k_{slow}$, $B_{0slow}$, $Y_{slow}$, $B_{0, total}$ at different FA concentrations using two-substrate model

| PPre-treatment Parameters | Control | pH 10 | $NH_4^+$—N 800 | FA 85 | FA 250 | FA 420 | FA 680 |
|---|---|---|---|---|---|---|---|
| $k_{rapid}$ ($d^{-1}$) | 0.33 ± 0.04 | 0.48 ± 0.07 | 0.33 ± 0.05 | 0.51 ± 0.07 | 0.54 ± 0.06 | 0.61 ± 0.05 | 0.68 ± 0.04 |
| $B_{0, rapid}$ (L $CH_4$/kg VS added) | 121 ± 17 | 175 ± 8 | 125 ± 22 | 146 ± 12 | 155 ± 10 | 159 ± 8 | 161 ± 4 |
| $Y_{rapid}$ | 0.22 ± 0.03 | 0.27 ± 0.02 | 0.21 ± 0.03 | 0.27 ± 0.02 | 0.29 ± 0.02 | 0.30 ± 0.01 | 0.30 ± 0.01 |
| $k_{slow}$ ($d^{-1}$) | 0.04 ± 0.03 | 0.05 ± 0.01 | 0.01 ± 0.04 | 0.01 ± 0.05 | 0.03 ± 0.03 | 0.05 ± 0.02 | 0.02 ± 0.02 |
| $B_{0, slow}$ (L $CH_4$/kg VS added) | 56 ± 10 | 400 ± 1500 | 58 ± 14 | 74 ± 254 | 49 ± 15 | 53 ± 5 | 51 ± 16 |

TABLE 4-continued

Determined $k_{rapid}$, $B_{0rapid}$, $Y_{rapid}$ and $k_{slow}$, $B_{0slow}$, $Y_{slow}$, $B_{0,total}$ at different FA concentrations using two-substrate model

| PPre-treatment Parameters | Control | pH 10 | $NH_4^+$—N 800 | FA 85 | FA 250 | FA 420 | FA 680 |
|---|---|---|---|---|---|---|---|
| $Y_{slow}$ | 0.10 ± 0.01 | 0.75 ± 28 | 0.10 ± 0.02 | 0.14 ± 47 | 0.09 ± 0.02 | 0.10 ± 0.01 | 0.09 ± 0.03 |
| $B_{0,total}$ (L $CH_4$/kg VS added) | 177 ± 20 | 575 ± 1500 | 183 ± 26 | 220 ± 254 | 204 ± 18 | 212 ± 9 | 212 ± 17 |

The third and fifth columns in the table indicate poor parameter identification

This study showed that pre-treatment of secondary sludge using FA at >250 mg $NH_3$—N/L can enhance anaerobic methane production, which was due to the increased k and $B_0$. The higher solubilization of FA pre-treated secondary sludge might contribute to the enhanced k (FIG. 1). The increased $B_0$ indicates that FA pre-treatment at >250 mg $NH_3$—N/L transformed some non-biodegradable materials in secondary sludge to biodegradable substances. However, the higher solubilisation of secondary sludge was not responsible for the improved $B_0$. This is because that pH 10 pre-treatment achieved similar solubilisation of secondary sludge to FA pre-treatment of 85-680 mg $NH_3$—N/L but did not improve $B_0$. Paul and Liu (2012) and Wang et al. (2014) also showed that increased solubilisation of secondary sludge did not necessarily improve $B_0$. This was in contrast to the results of FNA pre-treatment, where increased solubilisation of secondary sludge was supposed to play a role in the improved $B_0$ (Wang et al., 2013). Two-substrate model further indicated that the FA induced improvement in $B_0$ and k could be attributed to the rapidly biodegradable substances rather than the slowly biodegradable substances.

Figure 5:
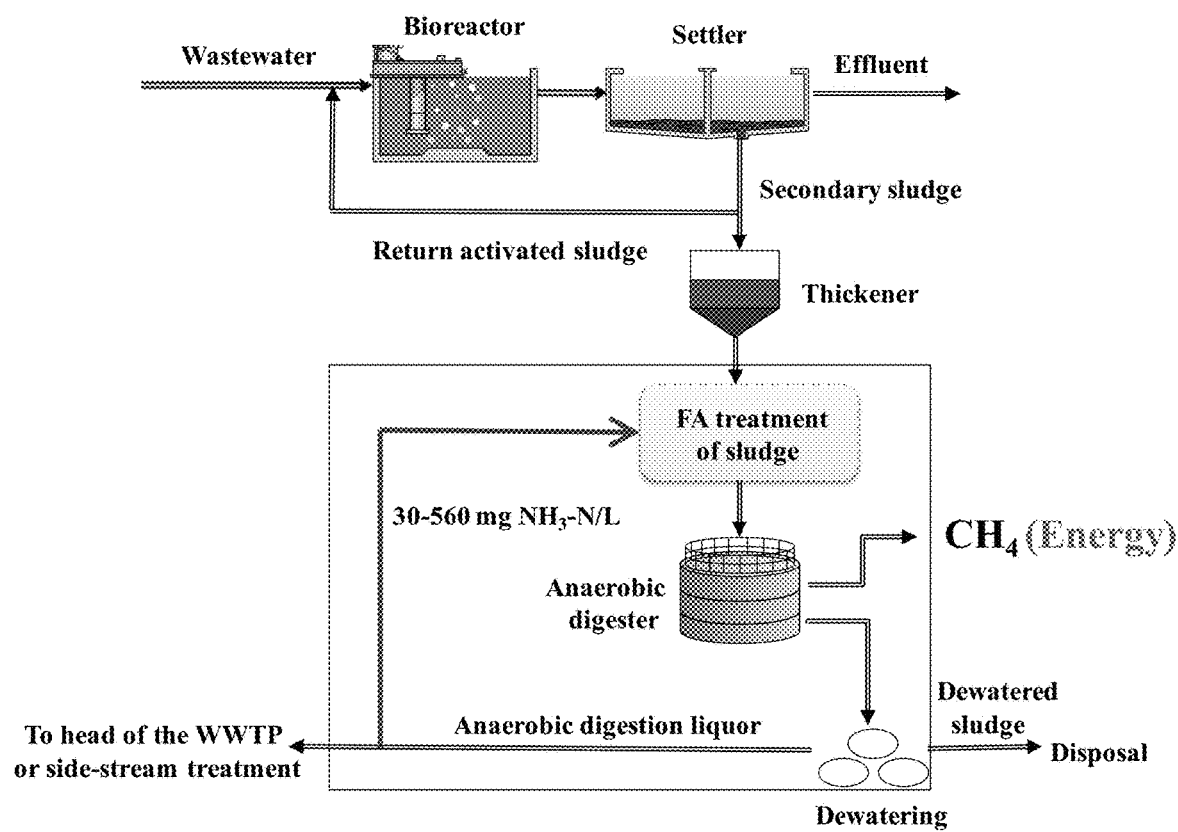
FIG. 5 shows a flowsheet of a "closed-loop" concept in a WWTP based on the proposed FA pre-treatment technology in example 1 to maximize energy recovery in the form of methane.

A "closed-loop" concept in a WWTP based on the proposed FA pre-treatment technology was demonstrated in FIG. 5. FA is a recoverable chemical, which can be obtained directly from the waste (i.e. anaerobic digestion liquor) of WWTPs. Anaerobic digestion liquor generally has an ammonium concentration of 1.0-2.0 g N/L, and a pH of 7.5-8.6. FA concentration can also easily reach 680 mg $NH_3$—N/L by adding a moderate amount of alkali. The improved methane production would correspond to the reduced amount of secondary sludge requesting transport and disposal, thereby decreasing corresponding costs. Since this FA pretreatment technology aims to use the WWTPs' waste (i.e. anaerobic digestion liquor) to enhance methane production from the WWTPs, it will set an example for the paradigm shift of the WWTPs from 'linear economy' to 'circular economy'.

The experimental results were acquired via the BMP tests in the study. In order to assess the potential economic feasibility of the suggested FA-based technology, the secondary sludge with and without FA pre-treatment was assumed to go through continuous anaerobic digestion with an SRT of 15 days in a full-scale WWTP by a desktop scaling-up study (see Table S1). Numerical uncertainty propagation method described by Batstone (2013) was adopted to estimate the methane production using equation (4). Equation 4 is used to estimate anaerobic methane production in a continuous anaerobic digester based on BMP tests determined $B_0$ and k.

$$B(t) = B_0 \times (1 - 1/(1+k \times t)) \quad (4)$$

FIG. 2 demonstrated that the highest methane production at a digestion time of 15 d was attained in the case of secondary sludge pre-treatment under 420 mg $NH_3$—N/L. Therefore, the FA pre-treatment at 420 mg $NH_3$—N/L was selected for the following economic and environmental evaluations. According to equation (4), the biochemical methane production (i.e. B(t), t=15 days) from secondary sludge were determined as 170 and 120 L $CH_4$/kg VS added, respectively, for the cases of FA pre-treatment at 420 mg $NH_3$—N/L and control based on the corresponding $B_0$ and k. This corresponds to sludge degradations (VS basis) of 32% and 23%, respectively. The economic evaluation results were shown in Table S1. In comparison to the system without FA pre-treatment, FA pre-treatment at 420 mg $NH_3$—N/L could save 0.5/person/year (see Table S1). This could be attributed to the improved methane production (saving 0.4/person/year) and enhanced degradation of secondary sludge (saving $0.3/person/year) subtracting the additional cost ($0.2/person/year) associated with secondary sludge pre-treatment. Consequently, the FA-based pre-treatment technology is economically favourable. However, it should be pointed out that the economic analysis results should only be considered as indicative because they would depend on the local conditions and might alter from nation to nation.

The environmental analysis of the suggested FA pre-treatment technology was also assessed on the basis of $CO_2$ emission. Compared with the control, $CO_2$ emission was predicted to decrease by 3.0 kg $CO_2$/person/year with FA pre-treatment under 420 mg $NH_3$—N/L (Table S1). This was due to the fact that less fossil fuel would be consumed because of the improved methane production although FA-based technology itself would incur minor $CO_2$ emission. As a result, the FA-based technology is environmentally friendly.

Wang et al. (2013) previously proposed that the free nitrous acid (FNA)-based technology is a promising technology for enhancing energy recovery in the form of methane. However, the advantage of this technology lies in the in-situ FNA production via side-stream nitritation of anaerobic digestion liquor. Unfortunately, the side-stream nitritation reactor does not exist in most of the WWTPs, which makes the in-situ FNA production difficult. By contrast, the FA-based technology proposed in this example does not depend on side-stream nitritation reactor. The key chemical (i.e. FA) required for this technology can be attained directly from the anaerobic digestion liquor. Therefore, the FA-based technology is more applicable to the WWTPs without the side-stream nitritation reactor, whereas the FNA-based technology is more applicable to the WWTPs with the side-stream nitritation reactor.

The feasibility of enhancing anaerobic methane production from secondary sludge based on free ammonia (FA)

pretreatment was evaluated by biochemical methane potential (BMP) assays. The following conclusions can be drawn from this example:

FA pretreatment at above 250 mg $NH_3$—N/L is effective in improving anaerobic methane production from secondary sludge.

FA pretreatment at above 250 mg $NH_3$—N/L improves both biochemical methane potential and hydrolysis rate of secondary sludge.

FA pretreatment is a potentially economically and environmentally favorable technology for the pretreatment of secondary sludge before anaerobic digestion. The key chemical (i.e. FA) required for this technology is a renewable material and could be obtained directly from the anaerobic digestion liquor.

EXAMPLE 2

In this example, the treatment of primary sludge with free ammonia and its effect on an aerobic methane production from the primary sludge was investigated.

The substrate using this example was primary sludge, which was collected from a primary settler of a local biological nutrient removal WWTP. As the inoculum, the anaerobically digested sludge was got from a mesophilic anaerobic digester (SRT=15~18 days; SRT: sludge retention time) treating mixed sludge in above WWTP. The inoculum was used to biodegrade primary sludge in the biochemical methane potential tests to be described later. The characteristics of the inoculum and primary sludge were listed in Table 5

TABLE 5

Characteristics of primary sludge and inoculum used in experiments.

| Parameter | Primary sludge | Inoculum |
| --- | --- | --- |
| Total Solids (TS) (g/L) | 37.4 ± 0.5 | 27.9 ± 0.2 |
| Volatile Solids (VS) (g/L) | 29.7 ± 0.5 | 21.1 ± 0.2 |
| Total Chemical Oxygen Demand (TCOD) (g/L) | 41.4 ± 0.5 | 28.9 ± 0.2 |
| Soluble Chemical Oxygen Demand (SCOD) (g/L) | 3.6 ± 0.1 | 0.7 ± 0.1 |
| Volatile Fatty Acid (VFA) (g/L) | 1.2 ± 0.1 | 0.1 ± 0.1 |
| Total Kjeldahl Nitrogen (TKN) (g N/L) | 2.7 ± 0.2 | 3.2 ± 0.1 |
| Soluble Kjeldahl Nitrogen (SKN) (g N/L) | 0.2 ± 0.1 | 1.3 ± 0.1 |
| $NH_4^+$ (g N/L) | 0.08 ± 0.01 | 1.2 ± 0.1 |
| pH | 5.6 ± 0.1 | 8.1 ± 0.1 |

A sequence of batch tests were done in order to assess the effect of FA pretreatment on the main characteristics (i.e. SCOD, SKN, $NH_4^+$—N and VFA) of primary sludge. 2.8 L primary sludge was divided equally into 7 same batch reactors. A certain volume of ammonium stock solution (3.0 mol $NH_4^+$—N/L) was then added to four reactors to get desired ammonium concentrations (i.e. 100, 300, 500 and 800 mg $NH_4^+$—N/L), as described in Table 6. The designed $NH_4^+$—N/L concentrations can be obtained in-situ from anaerobic digestion liquor in real WWTPs. After that, the pH of primary sludge was adjusted and controlled at 10.0±0.2. This resulted in the designated FA concentrations of 85, 250, 420 and 680 mg $NH_3$—N/L, respectively. The concentration of FA was calculated using mathematical expression $S_{(NH_4^+ + NH_3,N)} \times 10^{pH}/(K_b/K_w + 10^{pH})$, where the $K_b/K_w$ was determined by $K_b/K_w = e^{6,344/(273+T)}$ (Anthonisen et al., 1976). Control reactor was also set up without ammonium addition or pH control (Table 2). The remaining 2 batch reactors was pretreated by alkaline (pH=10) alone and ammonium ($NH_4^+$—N=800 mg/L) alone separately (Table 2). 800 mg $NH_4^+$—N/L was the maximum ammonium concentration applied in the studied FA pretreatment. This was to analyze whether the increased methane production to be determined later was because of ammonium or alkaline pretreatment. All the tests last for 24 hours.

TABLE 6

Pretreatment conditions employed in this study[a].

| Pretreatment | FA (mg $NH_3$—N/L) | $NH_4^+$—N (mg N/L) | pH |
| --- | --- | --- | --- |
| Control | 0.02 | 80[b] | 5.6[b] |
| FA | 85 | 100 | 10 |
|  | 250 | 300 | 10 |
|  | 420 | 500 | 10 |
|  | 680 | 800 | 10 |
| Alkaline | 68 | 80[b] | 10 |
| $NH_4^+$ | 0.2 | 800 | 5.6[b] |

[a]Temperature was room temperature (25° C.) in all tests. Pretreatment time was 24 h
[b]80 mg $NH_4^+$—N/L and pH 5.6 were the ammonium concentration and pH value in the raw primary sludge The main characteristics (SCOD, SKN, $NH_4^+$—N and VFA) of primary sludge before and after pretreatment were measured in triplicate. The measured changes of SCOD, SKN, $NH_4^+$—N and VFA during the 24 h pretreatment period were then expressed as a biomass specific value by dividing by the corresponding VS of primary sludge.

After pretreatment, anaerobic methane production from primary sludge with and without FA, alkaline and ammonium pretreatment was investigated using biochemical methane potential (BMP) assays, as detailed in Jensen et al. (2011) and Wang et al. (2013). The pH value of primary sludge with alkaline and FA pretreatment were adjusted to 5.6±0.2 (i.e. pH value in control vial, see Table 6) using hydrochloric acid (1 mol/L). 75 mL inoculum and 25 mL primary sludge with a ratio of about 2.0±0.1 based on the dry VS were added into 160 mL serum vials. All vials were flushed with nitrogen gas to remove oxygen and sealed with rubber stoppers and aluminium crimp caps before the anaerobic sludge digestion. Afterwards, they were placed in a temperature controlled incubator at 35±1° C. for 50 days to ensure the complete anaerobic digestion. In addition, one blank was set up, where equivalent volume of Milli-Q water instead of primary sludge were added and mixed with inoculum. All tests were operated in triplicate.

The biogas production and composition were monitored. The volume of methane was determined by multiplying the volume of biogas by the percentage of methane in biogas and calculated as the value under standard conditions (1 atm, 25° C.). The methane generation from primary sludge was calculated by subtracting that in blank vial. Methane production was reported as the volume of methane generated per kilogram of VS added (L $CH_4$/kg VS added).

The sludge samples were filtered through disposable Millipore filter units with a 0.45 μm pore size for the analyses of SCOD, SKN, $NH_4^+$—N and VFA. The $NH_4^+$—N concentrations were determined using a Lachat Quik-Chem 8000 flow injection analyzer (Lachat Instrument, Milwaukee). The analyses of TS, VS, TCOD, SCOD, TKN, SKN and VFA were conducted in accordance with Standard Methods (APHA, 2005). The pH of sludge was measured using a calibrated glass body probe (TPS, Brisbane, Australia). Biogas composition ($N_2$, $H_2$, $CH_4$ and $CO_2$) was determined with a Perkin Elmer loop injection gas chromatography (GC) equipped with a thermal conductivity detector. The volume of biogas was tested by a manometer at the start of each sampling event.

The hydrolysis rate (k) and biochemical methane potential ($B_0$) were evaluated by fitting the experimental data of methane production in BMP tests to the first order kinetic model using a modified version of Aquasim 2.1d. Residual sum of squares (RSS) between the measured data and model predicted data was objective function (J) (Batstone et al., 2003). The optimal set of k and $B_0$ will be the one under which the RSS is minimized ($J_{min}$). The first-order kinetic model was shown in Eq. (1) (Batstone et al., 2003; Wang et al., 2013).

$$B(t) = B_0(1 - e^{-kt}) \quad (1)$$

where B (t) is biochemical methane production at t (L $CH_4$/kg VS); t is time (d); $B_0$ is biochemical methane potential (L $CH_4$/kg VS); k is hydrolysis rate ($d^{-1}$).

The VS destruction percentage of primary sludge was determined by Eq. (2) (Metcalf and Eddy, 2003):

$$Y(t) = B(t)/380 \times R_{SS} \quad (2)$$

where Y(t) is the VS destruction percentage of primary sludge at time t; 380 is theoretical biochemical methane potential in the standard conditions (1 atm, 25° C.) (L $CH_4$/kg TCOD); $R_{SS}$ is measured ratio of VS to TCOD in the primary sludge (i.e. 0.72 in this study).

The primary sludge degradation extent ($Y_0$) was determined by Eq. (3) (Metcalf and Eddy, 2003):

$$Y_0 = B_0/380 \times R_{SS} \quad (3)$$

where $B_0$=biochemical methane potential (L $CH_4$/kg VS); 380=theoretical $B_0$ in the standard conditions (1 atm, 25° C.) (L $CH_4$/kg TCOD); $R_{SS}$=measured ratio of VS to TCOD in the primary sludge (i.e. 0.72 in this study).

The uncertainty surface of $B_0$ and k were determined using objective surface searching based on the method of Batstone et al. (2003).

Figure 6:
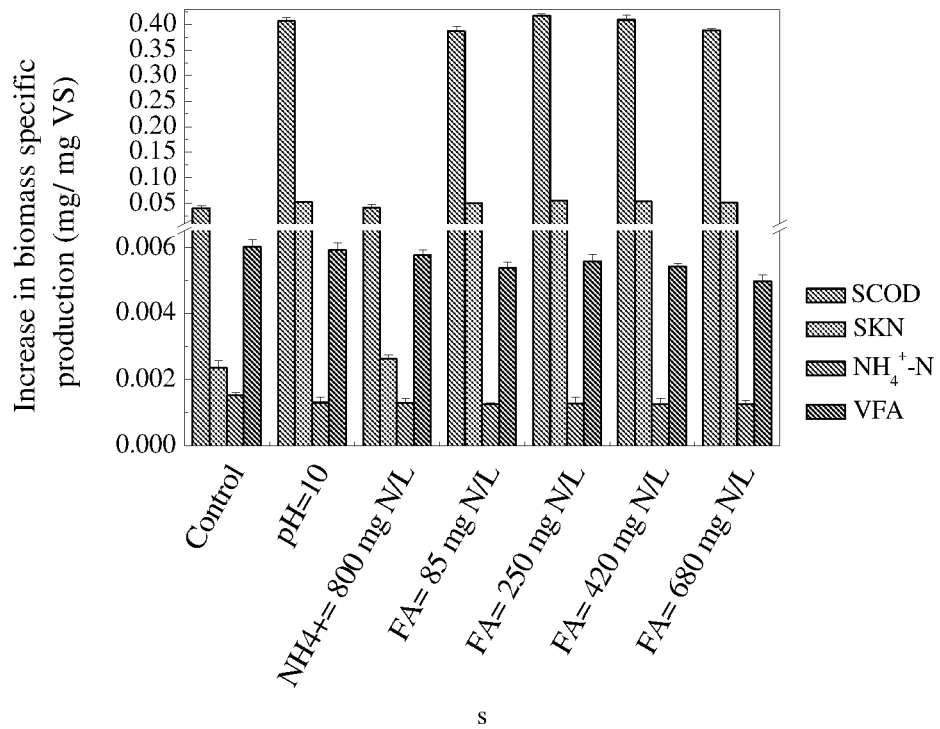
FIG. 6 shows a graph of changes in main characteristics of primary sludge after various pretreatment for 24 h I example 2. Error bars represent standard errors of triplicate tests.

Effect of FA pretreatment on primary sludge solubilization—FIG. 6 presented the changes in main characteristics of primary sludge after 24 h pretreatment using FA (85~680 mg $NH_3$—N/L), ammonium (800 mg $NH_4^+$—N/L) and alkaline (pH=10). The increase in SCOD in primary sludge pretreated by all FA concentrations was similar (p>0.05) and was about 10 times (p<0.05) as much as that (0.40 versus 0.04 mg COD/mg VS) formed in control over the same period. This revealed that significant solubilization of primary sludge occurred following FA pretreatment. The increased SCOD release (0.40 mg COD/mg VS) in the scenario of alkaline pretreatment (pH=10) was comparable (p>0.05) with that in the case of FA pretreatment, whereas ammonium pretreatment did not increase release of SCOD compared to the control (p>0.05). A similar trend was also observed in the case of SKN (FIG. 1). FA pretreatment at all levels (85~680 mg $NH_3$—N/L) played a similar (p>0.05) and significant (p<0.05) role in SKN release, which reached 0.05 mg SKN/mg VS. This was similar (p>0.05) to the SKN release in the case of alkaline pretreatment at pH 10. By contrast, an SKN release of only 0.002 mg SKN/mg VS was observed in the case of control, which was similar to the SKN release from primary sludge pretreated by ammonium at 800 mg $NH_4^+$—N/L. This corroborated the SCOD results.

Nevertheless, the $NH_4^+$—N and VFA results had a different trend from the SCOD and SKN results. The amounts of produced $NH_4^+$—N and VFA from primary sludge were similar (p>0.05) in all pretreatment conditions although higher SKN and SCOD release were observed in the cases of FA and alkaline pretreatment. This indicated that although the organic materials of primary sludge were solubilized significantly in the cases of FA and alkaline pretreatment, they could not be further biodegraded to produce $NH_4^+$—N and VFA probably due to the inhibition/toxicity of FA on microbes.

Figure 7A:
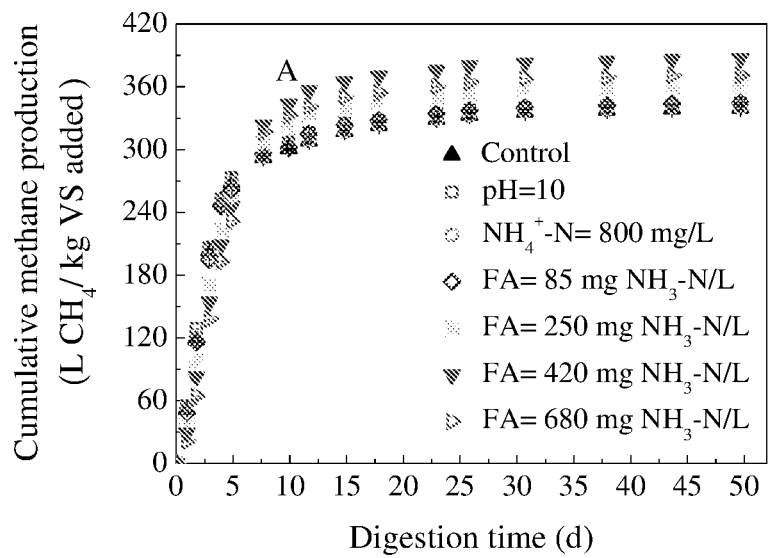
FIGS. 7A and 7B show graphs of cumulative anaerobic methane production (A) and VS destruction (B) of primary sludge with FA (85~680 mg $NH_3$—N/L), alkaline (pH=10) and ammonium (800 mg $NH_4^+$—N/L) pretreatment in example 2. Error bars represent standard errors of triplicate tests.

Effect of FA pretreatment on anaerobic methane production from primary sludge—After the pretreated primary sludge was mixed with the inoculum (i.e. anaerobically digested sludge) in the BMP tests, the cumulative methane production was recorded until it reached a stationary level. FIG. 7A showed that the cumulative methane production from primary sludge with FA pretreatment under 250~680 mg $NH_3$—N/L were less (p<0.05) than the control when the digestion time was less than 7 d, but were higher (p<0.05) than the control afterwards. This revealed that FA pretreatment at a higher concentration (e.g. >250 mg $NH_3$—N/L) is effective in enhancing methane production from primary sludge when the digestion time is above 7 days. The cumulative methane production was also affected by FA concentration. When the digestion time was less than 7 d, FA pretreatment at 250 mg $NH_3$—N/L achieved a higher (p<0.05) methane production compared with FA pretreatment at 420 and 680 mg $NH_3$—N/L. On the contrary, the highest methane production was achieved at FA pretreatment of 420 mg $NH_3$—N/L while anaerobic digestion time was above Day 7. Interestingly, similar (p>0.05) methane production was achieved among the cases of FA pretreatment of 85 mg $NH_3$—N/L, alkaline pretreatment at pH 10, ammonium pretreatment of 800 mg $NH_4^+$—N/L and control over the 50 days' digestion period. These results indicated that alkaline pretreatment at pH 10 and ammonium pretreatment of 800 mg $NH_4^+$—N/L did not affect anaerobic methane production, and the improved methane production (digestion time >7 days) at FA >250 mg $NH_3$—N/L was due to FA rather than pH or ammonium alone.

Figure 7B:
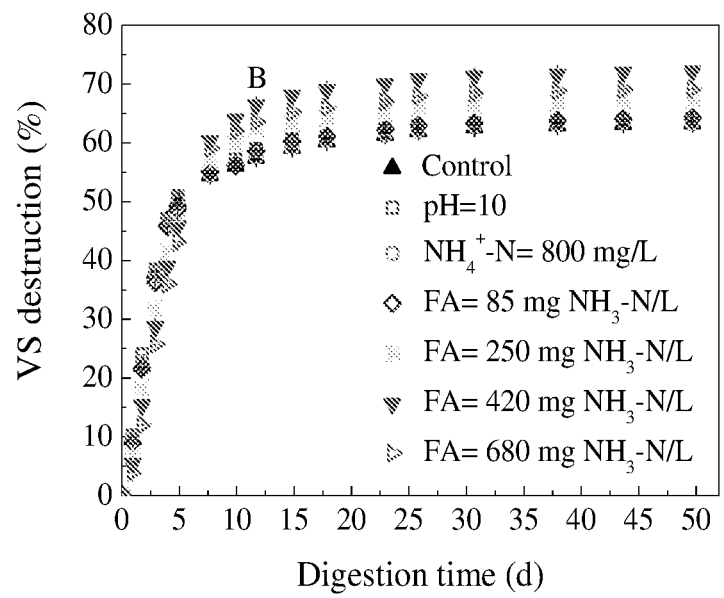

Methane production results reflected the VS destruction of primary sludge (see equation 2), which was shown in FIG. 7B. The VS destruction of primary sludge showed a similar trend to methane production. When the digestion time was above 7 days, the primary sludge pretreated by FA of 250~680 mg $NH_3$—N/L had a more (p<0.05) VS destruction than control, alkaline at pH 10 and ammonium at 800 mg $NH_4^+$—N/L pretreatment. At the end of the 50 days' BMP tests, the VS destruction (68%~73%) of primary sludge pretreated by FA of 250~680 mg $NH_3$—N/L were higher than those (all around 63%) of control, alkaline (pH 10) and ammonium pretreated primary sludge. These indicated that FA pretreatment at the higher concentration (e.g. >250 mg $NH_3$—N/L) could enhance VS destruction of primary sludge, thereby reducing the corresponding sludge transport and disposal cost.

Figure 8A:
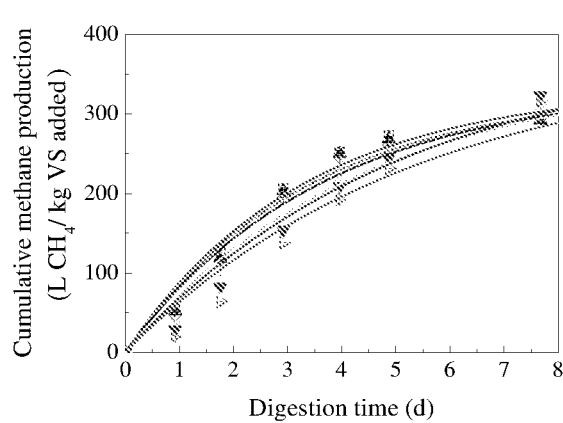
FIGS. 8A and 8B show graphs of measured and fitted biochemical methane production curves by a first-order kinetic model (symbols represent experimental measurements and lines represent simulated value) in example 2.
Figure 8B:
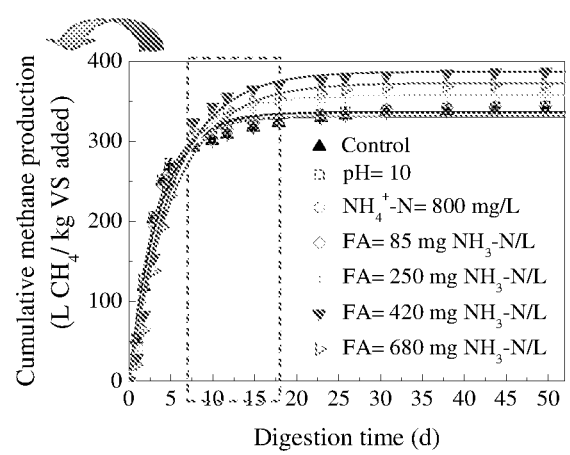

Model based analysis of methane production results—the experimentally measured methane production data from the 50 days' BMP test were fit to a first-order kinetic model with the results shown in FIG. 8. FIG. 8 demonstrated that the model well captured the measured data of methane production. The hydrolysis rate (k) and biochemical methane potential ($B_0$) were calculated and tabulated in Table 7. All in all, FA pretreatment at 250~680 mg $NH_3$—N/L had a negative influence (p<0.05) on k, which was reduced by 24~38% compared with control (i.e. from 0.29 $d^{-1}$ to 0.18~0.22 $d^{-1}$). In contrast, FA pretreatment at 250~680 mg $NH_3$—N/L significantly increased (p<0.05) $B_0$, which was enhanced by 8~17% in comparison to the control (i.e. from 331 L $CH_4$/kg VS to 357~387 L $CH_4$/kg VS) with the highest increase of $B_0$ achieved at an FA concentration of 420 mg $NH_3$—N/L. Correspondingly, the degradation extent ($Y_0$) of primary sludge was also enhanced from 0.63 to 0.68~0.73 after implementing FA pretreatment of 250~680 mg $NH_3$—N/L. However, FA pretreatment at 85 mg $NH_3$—N/L, alkaline pretreatment at pH 10 and ammonium pretreatment at 800 mg $NH_4^+$—N/L had similar (p>0.05) $B_0$ and k, and did not affect (p>0.05) $B_0$ and k substantially compared to the control.

TABLE 7

Estimated k, $B_0$ and $Y_0$ for different pretreatment conditions using a first-order kinetic model (with standard errors).

| Parameter | Control | Alkaline | $NH_4$—N | FA (mg $NH_3$—N/L) | | | |
|---|---|---|---|---|---|---|---|
| | | | | 85 | 250 | 420 | 680 |
| k (d$^{-1}$) | 0.29 ± 0.02 | 0.30 ± 0.02 | 0.29 ± 0.02 | 0.27 ± 0.01 | 0.22 ± 0.01 | 0.19 ± 0.01 | 0.18 ± 0.01 |
| $B_0$ (L/kg VS) | 331 ± 4 | 336 ± 4 | 331 ± 4 | 337 ± 4 | 357 ± 4 | 387 ± 6 | 373 ± 7 |
| $Y_0$ | 0.63 ± 0.01 | 0.64 ± 0.01 | 0.63 ± 0.01 | 0.64 ± 0.01 | 0.68 ± 0.01 | 0.73 ± 0.01 | 0.71 ± 0.01 |

Figure 9:
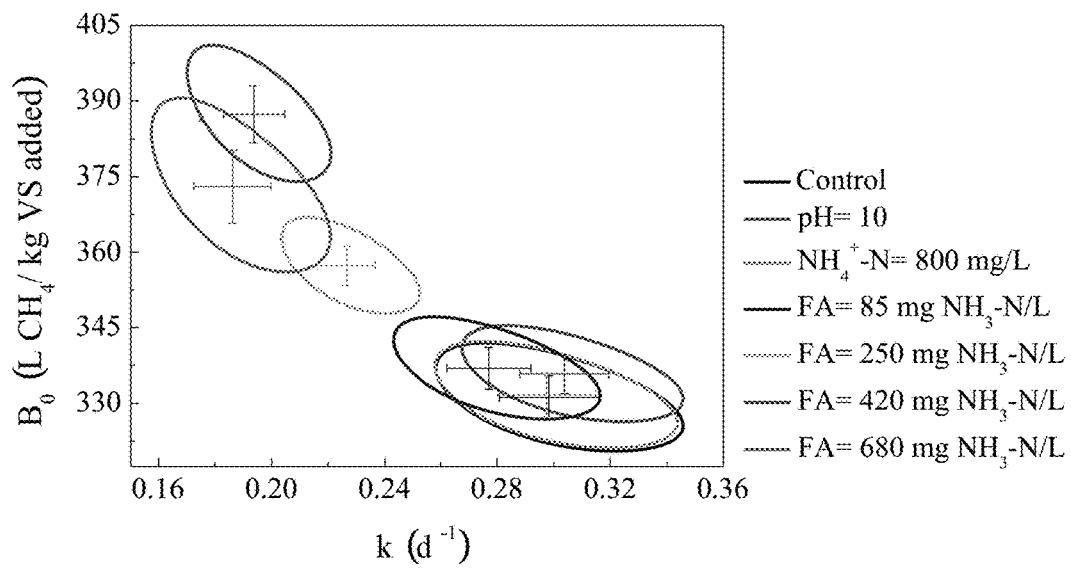
FIG. 9 shows 95% confidence regions of hydrolysis rate (k, $d^{-1}$) and biochemical methane potential ($B_0$, L $CH_4$/kg VS added) in various pretreatment systems in example 2.

FIG. 9 showed the 95% confidence regions of $B_0$ and k in all the studied cases. The overlapping confidence regions among control, FA of 85 mg $NH_3$—N/L, alkaline and ammonium pretreatment indicated statistically the similar $B_0$ and k. In contrast, the confidence regions based on FA pretreatment of 250~680 mg $NH_3$—N/L moved to the left and upward, indicating k was negatively affected and $B_0$ was improved by FA concentrations of 250~680 mg $NH_3$—N/L.

FA pretreatment technology for enhancing anaerobic methane production from primary sludge—This example demonstrated that FA pretreatment at >250 mg $NH_3$—N/L was effective in increasing anaerobic methane production from full-scale primary sludge while the digestion time was more than 7 days. The model based analysis revealed that the improved $B_0$ by FA pretreatment was responsible for the increased anaerobic methane production.

Figure 10:
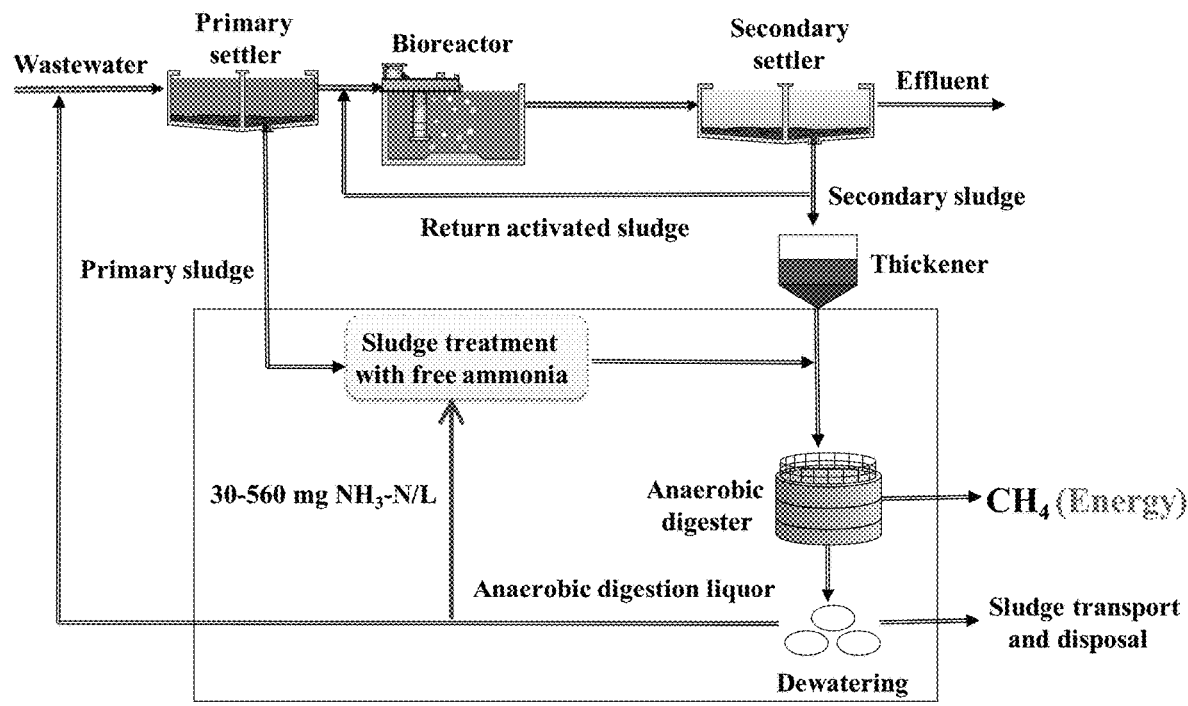
FIG. 10 shows a flowsheet of a "closed loop" in a WWTP based on the proposed FA pretreatment technology to enhance anaerobic methane production from primary sludge.

Based on the proposed FA pretreatment technology, a novel concept of "closed loop" in the WWTP was described in FIG. 10. As a recoverable chemical, FA could be produced from the anaerobic digestion liquor directly (pH 7.5~8.6, 1.0~2.0 g $NH_4^+$—N/L, and 33° C.). That is equivalent to the FA level of 30~560 mg $NH_3$—N/L (Cervantes, 2009; Fux et al., 2006), which is already adequate for increasing the production of methane (i.e. FA >250 mg $NH_3$—N/L). FA level of 680 mg $NH_3$—N/L could also be easily reached through dosing moderate amount of alkali. The enhanced production of methane would be equivalent to the reduced amount of primary sludge that would require transportation and disposal, thus decreasing the corresponding costs. As this FA technology relies on the usage of the WWTPs waste (i.e. anaerobic digestion liquor) to enhance anaerobic methane production from the WWTPs, it will set an example for the paradigm shift of the WWTPs from 'linear economy' to 'circular economy'.

To further elucidate the applicability of the proposed FA pretreatment technology regarding its economic feasibility, the experimental results acquired in this study were used to conduct the economic analysis of the FA technology. This was conducted in the full-scale WWTP with an anaerobic digester at a 15-day SRT by using a desktop scaling-up analysis. FIG. 7 showed that when the digestion time was 15 d, the most methane production was obtained under the pretreatment condition of 420 mg $NH_3$—N/L, under which methane production from primary sludge was measured as 365 L $CH_4$/kg VS added (320 L $CH_4$/kg VS added in the case of control), corresponding to a sludge destruction (VS basis) of 68% (60% in the case of control). Therefore, the FA pretreatment at 420 mg $NH_3$—N/L was selected for the following economic and environmental evaluations. The economic analysis results were described in Table S1. Compared to the WWTPs without FA pretreatment, a 420 mg $NH_3$—N/L FA pretreatment would save 0.8/PE/year (Table S1; PE: population equivalent), attributing to the increased production of methane (i.e. saving 1.0/PE/year) and the improved degradation of primary sludge (i.e. saving 0.5/PE/year) subtracting the possible additional cost (0.7/PE/year) related to primary sludge pretreatment. Therefore, the FA pretreatment technique is economically favourable. Nevertheless, it should be noted that the results of economic evaluation reported in this work should be only considered as indicative due to the fact that the actual cost might be variable depending on local conditions, which also might change from nation to nation.

The potential environmental impact of the proposed FA pretreatment technique was also analyzed in terms of $CO_2$ emission. In comparison to the control, the overall $CO_2$ emission was estimated to decline by 7.0 kg $CO_2$/PE/year with an FA pretreatment at 420 mg $NH_3$—N/L. The decreased $CO_2$ emission was due to the less consumption of fossil fuel resulting from the enhanced methane production although the FA pretreatment technology itself might cause minor $CO_2$ emission. Consequently, the FA technology could be considered environmentally friendly.

It should be emphasized that although FA pretreatment can be used as a potential technology for enhancing anaerobic methane production, the direct quantitative efficiency comparison with other documented technologies are difficult since the results would largely depend on sludge characteristics. Therefore, future study in this area is needed using the same sludge and under similar operating conditions.

Example 1 demonstrated that FA pretreatment technology was also able to enhance anaerobic methane production from secondary sludge (Wei et al., 2017). This indicated that the FA pretreatment technology could be implemented on the mixture of primary sludge and secondary sludge to maximize methane production from the waste stream of the WWTPs. In contrast, although previously Wang et al. (2013) reported that the free nitrous acid (FNA) pretreatment technique was an effective technology for improving anaerobic methane production from secondary sludge, the FNA pretreatment technology had a negative effect on anaerobic methane production from primary sludge (Zhang et al., 2016). Therefore, the FNA pretreatment can only be implemented on secondary sludge. Also, one important advantage of the FNA-based technology is the in-situ production of FNA through the side-stream nitritation of the anaerobic digestion liquor (Wang et al., 2013). Unfortunately, majority of the current WWTPs does not have a side-stream nitritation reactor, which would make the in-situ production of FNA difficult. By comparison, the FA technology of this work would not require a side-stream nitration reactor. The required FA for this new technology could be directly obtained from the anaerobic digestion liquor easily. Thus, the FA pretreatment is more applicable to those WWTPs without side-stream nitration reactor.

It should be pointed out that this work is merely a proof-of-concept study for the proposed FA technology and thus the further technology optimization was not performed in this work. FA concentration and pretreatment time could be adjusted to achieve even higher methane production. Also, continuous tests will be conducted to evaluate the possible effect of FA pretreatment on the dewaterability of anaerobic digestate. This was not conducted in this work because large amounts of inoculum have been added to the BMP test vial, which accordingly mask the impacts of FA on the dewaterability of the anaerobically digested primary sludge.

The model-based analysis in this example showed a greater biochemical methane potential ($B_0$) after FA pretreatment of 250~680 mg $NH_3$—N/L, which was 8~17% higher than that of raw primary sludge. The higher $B_0$ contributed to the improved performance of anaerobic methane production. However, the hydrolysis rate (k) was decreased by 24~38% following FA pretreatment of 250~680 mg $NH_3$—N/L compared to the control. This explained the lower methane production during the first 7 days' BMP test period compared to the control. The FA pretreatment technology is in contrast to the other reported pretreatment technologies (e.g. Ge et al., 2010). For instance, the temperature phased anaerobic digestion generally increases k without affecting $B_0$ (Ge et al., 2010), whereas FNA pretreatment negatively affect both $B_0$ and k of primary sludge (Zhang et al., 2016).

FA pretreatment of 250~680 mg $NH_3$—N/L resulted in a higher solubilization of primary sludge, as indicated by the higher release of SCOD and SKN (see FIG. 6). This revealed that more cells and/or EPS might be destroyed and converted to soluble substrates after FA pretreatment. However, the higher solubilisation of primary sludge was not responsible for the improved $B_0$. This is due to the fact that FA pretreatment of 85 mg $NH_3$—N/L and pH 10 pretreatment achieved similar solubilisation of primary sludge to FA pretreatment of 250~680 mg $NH_3$—N/L but did not increase $B_0$. Zhang et al. (2016) also showed that increased solubilisation of primary sludge did not necessarily improve $B_0$. The improved $B_0$ might be because of that FA pretreatment converted part of the refractory materials in primary sludge to biodegradable materials. Nevertheless, FA pretreatment of 250~680 mg $NH_3$—N/L had a negative effect on k. This indicated that the hydraulic retention time of the anaerobic digester should be long enough (e.g. >7 days in this study) in order to achieve a higher anaerobic methane production while applying the FA pretreatment technology. However, this would not be a problem in reality. This is because that the hydraulic retention time of full-scale anaerobic digester is commonly above 10 days (e.g. 15~20 d) and therefore anaerobic methane production of primary sludge would be enhanced using FA pretreatment.

EXAMPLE 3

The conventional biological nitrogen removal process in wastewater treatment systems is achieved by complete oxidation of ammonium ($NH_4^+$) to nitrate ($NO_3^-$) (nitrification) followed by the reduction of nitrate ($NO_3^-$) to nitrogen gas ($N_2$) (denitrification). Both nitrification and denitrification involve nitrite ($NO_2^-$) as an intermediate. If nitrification is terminated at nitrite, denitritation from nitrite to nitrogen gas can be attained (i.e. nitrogen removal via nitrite pathway). Nitrogen removal via nitrite instead of nitrate can decrease oxygen demand for nitrification by 25%, and also reduce chemical oxygen demand (COD) requirement for denitrification by 40%. The reduction in COD requirement will be significantly beneficial for wastewater with a low COD to nitrogen ratio. The key point of attaining nitrite pathway is to selectively wash out nitrite oxidizing bacteria (NOB) from the system while retaining ammonium oxidizing bacteria (AOB). This example is related to the development of a free ammonia (FA)-based technology to selectively eliminate NOB and achieve the nitrite pathway based on side-stream sludge treatment.

In this example, one lab-scale sequencing batch reactor (SBR) with a working volume of 8 L was used. The operation of the SBR consisted of two phases: baseline phase (i.e. without FA treatment) and experimental phase (i.e. with FA treatment). The reactor was operated in an anoxic-aerobic mode (6 h per cycle).

Figure 11:
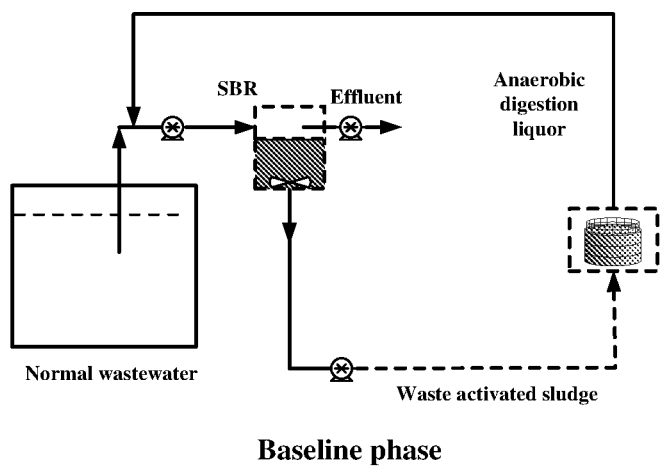
FIG. 11 shows a flowsheet in which the reactor was operated in the base line phase (i.e. without FA treatment) in example 3.

In the baseline line phase (i.e. without FA treatment), the reactor was operated in accordance with a flowsheet as shown in FIG. 11. Synthetic wastewater simulated a mixture of normal wastewater and anaerobic digestion liquor, with the precise composition further described in the next section. In each cycle, 2 L of synthetic wastewater was pumped into each SBR in the feeding period, which resulted in a hydraulic retention time (HRT) of 24 h. The SRT was maintained at 15 d by wasting 133 ml of mixed liquor per cycle. Dissolved oxygen (DO) was maintained at around 1.0 mg/L. The pH was recorded but not controlled, and this varied between 7.0 and 7.3 during a typical cycle. The SBR was operated in a temperature-controlled room (22±2° C.).

Figure 12:
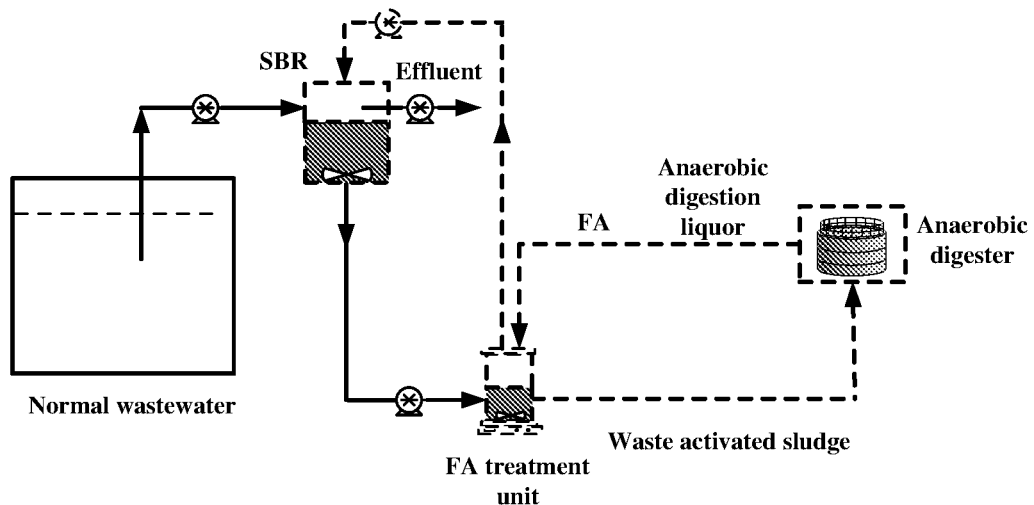
FIG. 12 shows a flowsheet in which the reactor was operated in the experimental phase (i.e. with FA treatment) in example 3.

In the experimental phase, approximately 2286 ml of sludge was wasted on a daily basis. The wasted sludge was first thickened and then transferred to an FA treatment unit on a daily basis (FIG. 2), and treated using 210 mg $NH_3$—N/L ($NH_4^+$—N=800 mg/L; pH=8.9; T=22° C.) for 24 h. As such, the average sludge treatment frequency was 0.29 reactor volume per day (i.e. (2286 ml/d)/(8000 ml of reactor working volume)=0.29. The SRT of the SBR was still maintained at 15 day by recalculating part of the FA-treated sludge back to the SBR. In the experimental phase, the reactor was operated in accordance with a flowsheet as shown in FIG. 12.

The synthetic wastewater consisted of both normal wastewater and anaerobic digestion liquor. The normal wastewater was comprised of various components to simulate real domestic wastewater, with the total chemical oxygen demand (TCOD) and total Kjeldahl nitrogen (TKN) concentrations being 300 mg/L and 50 mg/L, respectively. The detailed composition was (per litre): 83 mg milk powder, 60 mg sucrose, 61 mg starch, 12 mg peptone, 29 mg yeast extract, 45 mg $CH_3COONa$, 153 mg $NH_4Cl$ (40 mg $NH_4^+$—N), 14 mg $KH_2PO_4$, 13 mg $K_2HPO_4$, 600 mg $NaHCO_3$, 2.5 mg $FeSO_4.7H_2O$, 0.06 mg $ZnCl_2$, 0.06 mg $MnCl_2.4H_2O$, 0.19 mg $NaMoO_4.2H_2O$, 0.13 mg $CoCl_2.6H_2O$, 0.04 mg $NiCl_2.6H_2O$, 0.06 mg $CuSO_4$, 0.06 mg $H_3BO_3$, 0.19 mg $MgCl_2$, 0.44 mg $CaCl_2$. The anaerobic digestion liquor contained $NH_4HCO_3$ and was returned to the main-stream reactor (i.e. SBR) and contributed to an additional 20% nitrogen load.

Figure 13:
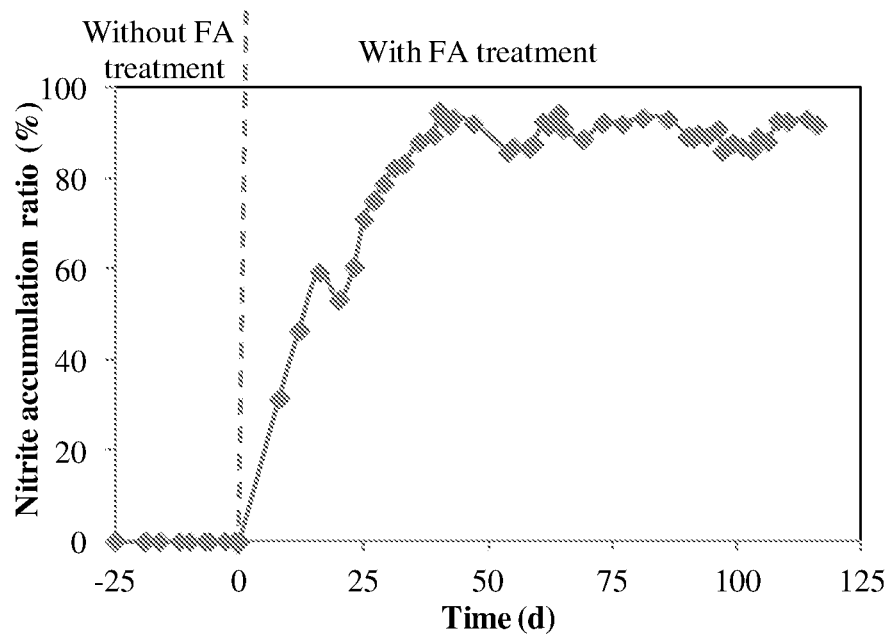
FIG. 13 shows a graph of nitrite accumulation ratio ($NO_2^-$—N/($NO_2^-$—N+$NO_3^-$—N)×100%) in the effluent of the reactor vs time for example 3.
Figure 14:
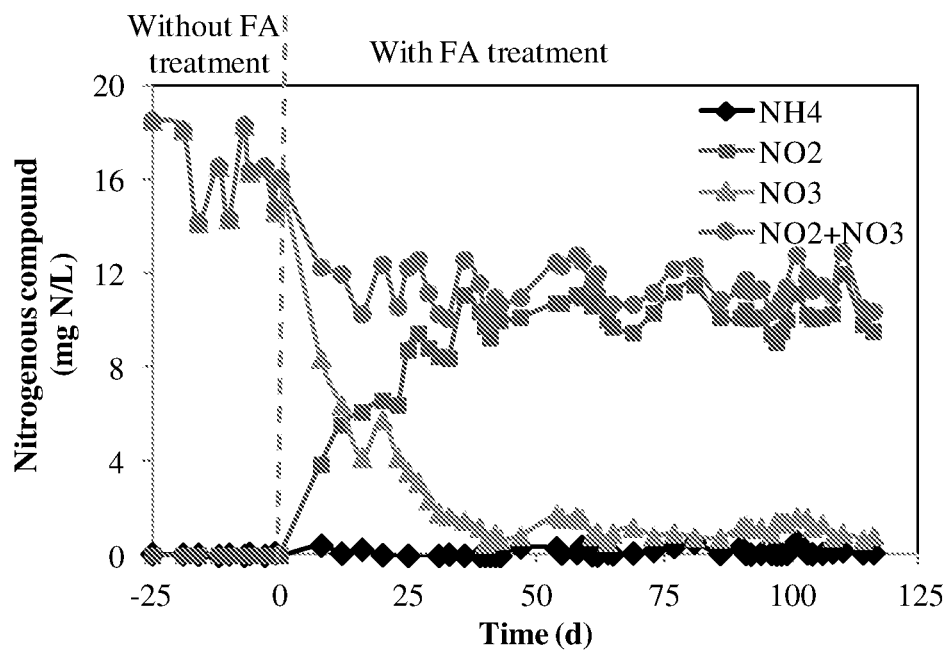
FIG. 14 shows a graph of nitrogenous compound concentration in the effluent of the reactor vs time for example 3.

FIG. 13 shows a graph of nitrite accumulation ratio ($NO_2^-$—N/($NO_2^-$—N+$NO_3^-$—N)×100%) in the effluent of the reactor. FIG. 14 shows nitrogenous compound concentration in the effluent of the reactor. In the results of FIGS. 13 and 14, the reactor was operated for more than 3 months before FA treatment. Only 25 days' data are shown in FIGS. 13 and 14.

The results shown in FIGS. 13 and 14 demonstrate that no nitrite accumulation was observed before FA treatment. After FA treatment, nitrite accumulation ratio increased quickly and stabilized at approximately 90%. Effluent $NO_2$—N+$NO_3^-$—N concentrations fluctuated between 14 and 18 mg N/L before FA treatment. After stable nitrite accumulation ratio (i.e. 90%) was achieved after FA treatment, the effluent $NO_2$—N+$NO_3^-$—N concentrations stabilized at around 11 mg N/L. This demonstrates the benefits of the nitrite pathway in enhancing the nitrogen removal performance after implementing FA treatment.

Figure 15:
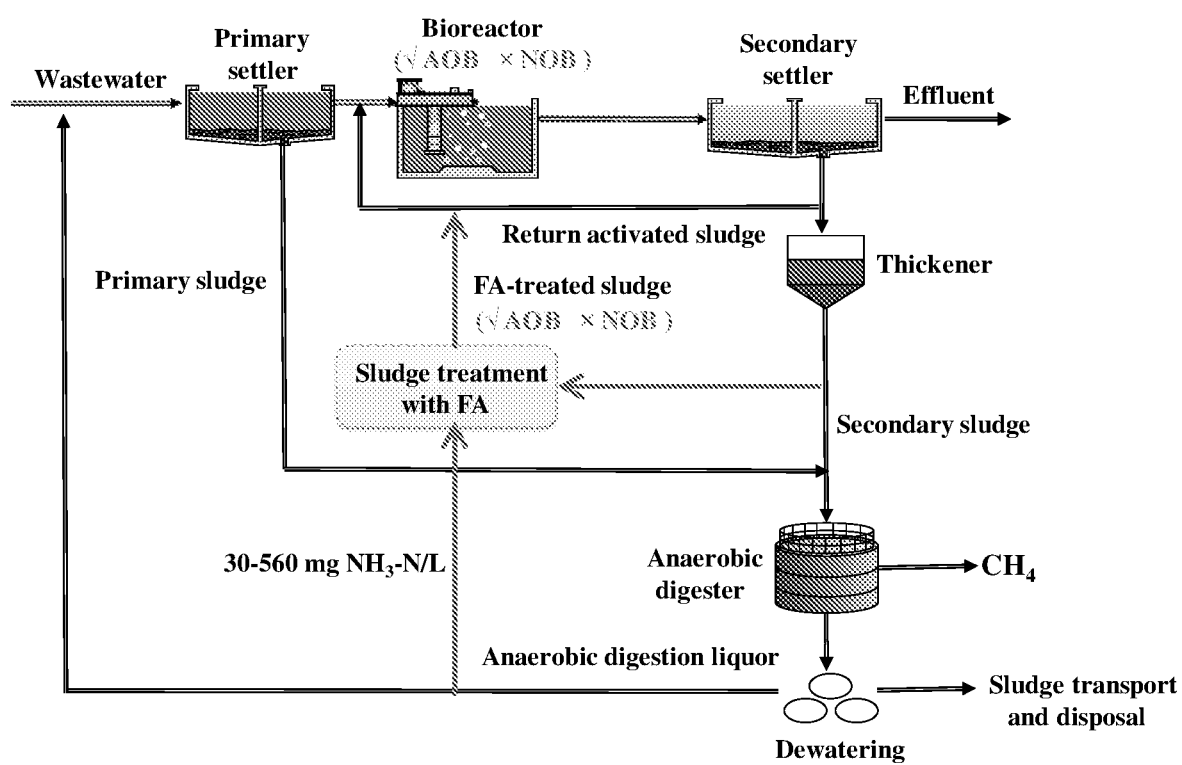
FIG. 15 shows a flowsheet for a novel "closed loop" concept in a WWTP based on the FA technology to selectively wash out nitrite oxidizing bacteria and achieve the nitrite pathway.

FIG. 15 shows a flowsheet for a novel "closed loop" concept in a WWTP based on the FA technology to selectively wash out nitrite oxidizing bacteria and achieve the nitrite pathway. In the bioreactor of FIG. 15, AOB is favoured over NOB, with the NOB effectively being washed out of the reactor by the FA treatment.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A method for treating a sludge derived from sewage or wastewater, the method comprising:
   a) subjecting the sludge to a treatment step at a pH of 8.9 or greater and a free ammonia content of 100 mg $NH_3$—N/L or greater;
   b) sending the sludge from step (a) to an anaerobic digester, to form methane and an anaerobic digestion liquor in the anaerobic digester; and
   c) returning at least part of the anaerobic digestion liquor to step (a),
   wherein treatment of the sludge with free ammonia at a pH of 8.9 or greater in step (a) is on an intermittent basis, and wherein the sludge is treated with free ammonia at a pH of 8.9 or greater for a period of from 2 hours to 7 days, followed by a non-treatment period of from 1 day to 3 months.

2. A method as claimed in claim 1 wherein the sludge comprises a secondary sludge from a secondary settler or from a bioreactor for treating sewage or wastewater, or the sludge comprises a primary sludge from a sewage or wastewater treatment plant, or the sludge comprises a primary sludge collected from a primary settler or a sludge collected from a screen.

3. A method as claimed in claim 1 wherein the pH in step (a) is from 8.9 to 10.5, or from 8.9 to 10.0, or from 8.9 to 9.5, or from 9.0 to 9.5, or from 9.1 to 9.5, or from 9.2 to 9.5, or from 9.3 to 9.5, or about 9.3.

4. A method as claimed in claim 1 wherein the free ammonia concentration in step (a) ranges from 100 to 1000 mg $NH_3$—N/L, or from 250 to 1000 mg $NH_3$—N/L, or from 250 to 900 mg $NH_3$—N/L, or from 250 to 800 mg $NH_3$—N/L, or from 250 to 700 mg $NH_3$—N/L, or from 250 to 680 mg $NH_3$—N/L, or from 400 to 700 mg $NH_3$—N/L, or from 420 to 680 mg $NH_3$—N/L.

5. A method as claimed in claim 1 wherein the pH is controlled to fall within the range of 8.9 or greater and the pH is controlled by monitoring the pH and adding an alkaline agent if the pH drops below 8.9.

6. A method as claimed in claim 1 wherein the free ammonia content in step (a) is obtained by adding a liquid containing dissolved ammonium ($NH_4^+$) having a concentration such that at the pH of step (a), the free ammonia content is achieved in the reactor in which step (a) is conducted.

7. A method as claimed in claim 6 wherein the liquid containing dissolved ammonium has a dissolved ammonium concentration of from 0.5 to 4 g/L $NH_4^+$—N, or from 1.0 to 3.0 g/L $NH_4^+$—N, or from 1.0 to 2.0 g/L $NH_4^+$—N.

8. A method as claimed in claim 1 wherein the sludge has a residence time in step (a) of from 2 hours to 1 week, or from 4 hours to 48 hours, or from 6 hours to 24 hours.

9. A method as claimed in claim 1 wherein the sludge is being fed to a downstream reactor in step (b) where methane is being produced and treatment of the sludge with free ammonia occurs on a continuous basis.

10. A method as claimed in claim 9 wherein anaerobic liquor is fed continuously to a reactor and alkali addition occurs when the pH drops below 8.9.

11. A method as claimed in claim 1 wherein the sludge is treated with free ammonia at a pH of 8.9 or greater for a period of from 2 hours to 7 days, followed by a non-treatment period of from 1 day to 1 month, or from 7 days to 1 month.

12. A method as claimed in claim 1 wherein the method comprises obtaining a primary sludge from sewage or wastewater, treating the primary sludge at a pH of 8.9 or greater and a free ammonia content of 100 mg $NH_3$—N/L or greater to form a treated sludge, feeding the treated sludge to an anaerobic digester to form methane and an anaerobic digestion liquor and returning at least some of the anaerobic digestion liquor to the primary sludge treatment step.

13. A method as claimed in claim 12 wherein a primary settler forms a sludge stream and a liquid stream, the liquid stream being fed to a bioreactor to form a secondary sludge, the secondary sludge also being fed to the anaerobic digester.

14. A method for treating a sludge derived from sewage or wastewater, the method comprising
   feeding a wastewater or sewage to a bioreactor, obtaining a secondary sludge from the bioreactor, treating the secondary sludge at a pH of 8.9 or greater and a free ammonia (FA) content of 100 mg $NH_3$—N/L or greater to obtain a treated secondary sludge, feeding the treated secondary sludge to an anaerobic digester to form methane and an anaerobic digestion liquor and passing at least some of the anaerobic digestion liquor to the step of treating the secondary sludge.

15. A method as claimed in claim 14 wherein the secondary sludge is thickened prior to the step of treating the secondary sludge with free ammonia.

16. A method as claimed in claim 15 wherein the sludge is thickened to a solids level in the range of from 2% to 15% by weight, or from 4% to 8% by weight.

17. A method for treating wastewater comprising the steps of treating wastewater or wastewater sludge in a bioreactor, passing part of a secondary sludge generated in the bioreactor to an anaerobic digester, treating another part of the secondary sludge produced in the bioreactor at a pH of 8.9 or greater and a free ammonia (FA) content of 100 mg $NH_3$—N/L or greater, and forwarding treated sludge to the bioreactor, wherein an anaerobic digestion liquor is removed from the anaerobic digester and part of the anaerobic digestion liquor is passed to the free ammonia treatment step.

18. A method as claimed in claim 17 wherein some of the anaerobic digestion liquor is returned to the bioreactor.

* * * * *